US010755350B1

(12) United States Patent
Cruz et al.

(10) Patent No.: US 10,755,350 B1
(45) Date of Patent: *Aug. 25, 2020

(54) SYSTEM, METHOD AND APPARATUS FOR MONITORING AND EXECUTION OF ENTRY AND EXIT ORDERS

(75) Inventors: William R. Cruz, Coral Gables, FL (US); Ralph L. Cruz, Coral Gables, FL (US); Peter A. Parandjuk, Miami, FL (US)

(73) Assignee: TradeStation Technologies, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/248,654

(22) Filed: Sep. 29, 2011

Related U.S. Application Data

(60) Division of application No. 12/434,444, filed on May 1, 2009, now abandoned, which is a continuation of
(Continued)

(51) Int. Cl.
*G06Q 40/04* (2012.01)
*G06Q 40/06* (2012.01)
(Continued)

(52) U.S. Cl.
CPC ............. *G06Q 40/04* (2013.01); *G06Q 40/06* (2013.01); *G06Q 40/00* (2013.01); *G06Q 40/025* (2013.01); *G06Q 40/08* (2013.01)

(58) Field of Classification Search
CPC ........ G06Q 40/04; G06Q 40/06; G06Q 40/00; G06Q 40/025; G06Q 40/08
See application file for complete search history.

(56) References Cited

U.S. PATENT DOCUMENTS

| 4,412,287 A | 10/1983 | Braddock, III |
| 4,674,044 A | 6/1987 | Kalmus et al. |

(Continued)

FOREIGN PATENT DOCUMENTS

| EP | 0 401 203 | 5/1990 |
| WO | WO 95/26005 | 9/1995 |

(Continued)

OTHER PUBLICATIONS

Nikolaos A. Mylonopoulos, Georgios I. Doukidis, George M. Giaglis. Assessing the Expected Benefits of Electronic Data Interchange through Simulation Modelling Techniques. In the Proceedings of the 3rd European Conference on Information Systems. (1995). (Year: 1995).*

(Continued)

*Primary Examiner* — Virpi H Kanervo
(74) *Attorney, Agent, or Firm* — Fish & Richardson P.C.

(57) ABSTRACT

An improved method and system to create and write a security trading strategy, back test the strategy and automatically execute and monitor the strategy in an Internet based trading environment. Upon occurrence of a market trigger condition, the automated process automatically generates entry and exit orders and sends the entry and exit orders to the market to be filled. A restriction check is also performed on the entry and exit orders. The automated process further monitors the entry and exit orders once they have been sent to be filled and intelligently modifies the entry and exit orders depending on market and strategy conditions.

16 Claims, 23 Drawing Sheets

Related U.S. Application Data application No. 11/543,886, filed on Oct. 6, 2006, which is a continuation of application No. 10/035,250, filed on Jan. 4, 2002, now Pat. No. 7,379,909, which is a continuation of application No. 09/968,849, filed on Oct. 3, 2001, now abandoned.

(60) Provisional application No. 60/237,870, filed on Oct. 4, 2000.

(51) Int. Cl.
*G06Q 40/00* (2012.01)
*G06Q 40/08* (2012.01)
*G06Q 40/02* (2012.01)

(56) References Cited

U.S. PATENT DOCUMENTS

| | | | |
|---|---|---|---|
| 4,677,933 A | 7/1987 | Rotella | |
| 4,903,201 A | 2/1990 | Wagner | |
| 5,101,353 A | 3/1992 | Lupien et al. | |
| 5,444,819 A | 8/1995 | Negishi | |
| 5,508,913 A | 4/1996 | Yamamoto et al. | |
| 5,717,989 A | 2/1998 | Tozzoli et al. | |
| 5,732,397 A | 3/1998 | DeTore et al. | |
| 5,745,706 A | 4/1998 | Wolfberg et al. | |
| 5,799,289 A | 8/1998 | Fukushima et al. | |
| 5,812,987 A | 9/1998 | Luskin et al. | |
| 5,819,238 A | 10/1998 | Fernholz et al. | |
| 5,845,266 A | 12/1998 | Lupien et al. | |
| 6,021,397 A | 2/2000 | Jones et al. | |
| 6,073,115 A | 6/2000 | Marshall | |
| 6,134,535 A | 10/2000 | Belzberg | |
| 6,177,940 B1 | 1/2001 | Bond et al. | |
| 6,188,992 B1 | 2/2001 | French | |
| 6,317,728 B1 | 11/2001 | Kane | |
| 6,401,080 B1 | 6/2002 | Bigus et al. | |
| 6,405,180 B2 | 6/2002 | Tilfors et al. | |
| 6,418,417 B1 | 7/2002 | Corby et al. | |
| 6,418,419 B1 | 7/2002 | Nieboer et al. | |
| 6,421,653 B1 | 7/2002 | May | |
| 6,493,681 B1* | 12/2002 | Tertitski et al. | 705/36 R |
| 6,493,682 B1 | 12/2002 | Horrigan et al. | |
| 6,557,007 B1 | 4/2003 | Pekowski et al. | |
| 6,594,643 B1 | 7/2003 | Freeny, Jr. | |
| 6,618,707 B1 | 9/2003 | Gary | |
| 7,024,387 B1 | 4/2006 | Nieboer et al. | |
| 7,043,449 B1 | 5/2006 | Li et al. | |
| 7,149,698 B2* | 12/2006 | Guheen et al. | 705/319 |
| 7,184,978 B1 | 2/2007 | Tams et al. | |
| 7,231,363 B1* | 6/2007 | Hughes et al. | 705/37 |
| 7,249,080 B1 | 7/2007 | Hoffman et al. | |
| 7,305,361 B2 | 12/2007 | Otero et al. | |
| 7,333,952 B1 | 2/2008 | Neyman et al. | |
| 7,356,499 B1 | 4/2008 | Amburn | |
| 7,376,614 B1 | 5/2008 | Scheinberg et al. | |
| 7,379,909 B1 | 5/2008 | Cruz et al. | |
| 7,383,220 B1* | 6/2008 | Keith | 705/37 |
| 7,389,263 B2 | 6/2008 | Gladstone | |
| 7,395,236 B2* | 7/2008 | Degraaf et al. | 705/36 R |
| 7,552,085 B2 | 6/2009 | Amburn | |
| 7,831,494 B2* | 11/2010 | Sloan et al. | 705/36 R |
| 8,175,956 B2 | 5/2012 | Amburn | |
| 2001/0034694 A1 | 10/2001 | Elias | |
| 2002/0004774 A1* | 1/2002 | Defarlo | G06Q 40/06 705/36 R |
| 2002/0004776 A1* | 1/2002 | Gladstone | 705/37 |
| 2002/0099641 A1 | 7/2002 | Mills et al. | |
| 2002/0133455 A1 | 9/2002 | Howorka et al. | |
| 2002/0138383 A1 | 9/2002 | Rhee | |
| 2002/0147671 A1* | 10/2002 | Sloan et al. | 705/36 |
| 2002/0174058 A1 | 11/2002 | Baghdady | |
| 2002/0184136 A1 | 12/2002 | Cleary | |
| 2003/0126068 A1 | 7/2003 | Hauk et al. | |
| 2005/0015323 A1 | 1/2005 | Myr | |
| 2005/0149427 A1 | 7/2005 | Meehan et al. | |
| 2007/0208645 A1 | 9/2007 | Hoffman et al. | |
| 2007/0244788 A1 | 10/2007 | Ferris | |
| 2008/0052215 A1 | 2/2008 | Tudisco | |
| 2008/0183639 A1 | 7/2008 | DiSalvo | |

FOREIGN PATENT DOCUMENTS

| | | | |
|---|---|---|---|
| WO | WO 97/22075 | 6/1997 | |
| WO | WO-9844444 A1 * | 10/1998 | G06Q 40/08 |

OTHER PUBLICATIONS

Morgan, J., "Smart Money Stop-Loss Orders Aren't Risk-Free," Newsday, Nassau and Suffolk Edition, Wednesday, Oct. 11, 1989, p. 53.

Fridrich, W.L., "When to Get in, When to Get out," Lotus, vol. 5, No. 10, p. 32, Oct. 1989.

AAII American Association of Individual Investors: "Computerized Investing," Jul./ Aug. 2000; vol. XIX, No. 4; pp. 1-27.

The Wall Street Journal, Tuesday, Jun. 2, 1998, "Why Wall Street Firms Trail in On-Line Battle," 2 pages.

Greg, Ip. Randall Smith, "Tense Exchange: Big Board's Members Face Off on the Issue of Automated Trading: Large Firms Demand It But Floor Brokers Fear for Their Livelihood," The Wall Street Journal, Nov. 15, 1999, A1.

Anonymous; Financial Market Trends; Paris: Nov. 1996, Issue 65; p. 103.

Charles Schwab, On Schwab: "Briefings," Summer 2000, pp. 52, AT5-AT8.

* cited by examiner

SYSTEM, METHOD AND APPARATUS FOR MONITORING AND EXECUTION OF ENTRY AND EXIT ORDERS

CROSS REFERENCE TO PRIORITY APPLICATION

The application is a Divisional of U.S. Ser. No. 12/434,444, entitled "System, Method and Apparatus for Monitoring and Execution of Entry and Exits Orders", filed on May 1, 2009, which claims priority of U.S. Ser. No. 11/543,886, entitled "System, Method and Apparatus for Monitoring and Execution of Entry and Exits Orders", filed on Oct. 6, 2006, which claims the priority of Divisional of U.S. Ser. No. 10/035,250, entitled "System, Method and Apparatus for Monitoring and Execution of Entry and Exit Orders", filed on Jan. 4, 2002, now U.S. Pat. No. 7,379,909, which claims the priority of nonprovisional application U.S. Ser. No. 09/968,849, entitled "System, Method and Apparatus for Monitoring and Execution of Entry and Exit Orders", filed on Oct. 3, 2001, which claims priority of provisional application, U.S. Ser. No. 60/237,870, entitled "System, Method and Apparatus for Monitoring and Execution of Buy and Sell Orders", filed on October 4,2000, all of which are incorporated herein by reference.

BACKGROUND OF THE INVENTION

Field of the Invention

The present invention relates generally to methods for trading securities, stocks, options, indexes, commodities and futures in a distributed network environment. In particular, the invention relates to a method and system in which a trader can write a trading strategy, back test the trading strategy and then automate that trading strategy to automatically generate entry and exit orders based upon the strategy. The invention constantly monitors market and strategy conditions and intelligently routes entry and exit orders for execution based upon the trading strategy and the monitored conditions, In addition, the invention alerts the user of trading opportunities due to changing market conditions and further informs the user of the status of the generated entry and exit orders.

Background and Objects of the Invention

Previous art related to Internet-based trading allows individual traders, professional traders and institutional traders to trade securities based upon market data. The existing prior art, however, does not allow traders to write trading strategies and back test the strategies on historical data prior to automatically implementing the strategies into real markets.

The financial industry has seen dramatic change over the past decade. The development of new technologies that quickly deploy information over the Internet has changed the methods of trading securities and commodities. The Internet has made it possible for institutional and other professional traders to improve their decisions relating to the management, placement, and execution of their trades. The Internet has also made it possible for individual traders to directly manage their own portfolios from their home. Many traders, who at one time relied entirely upon the assistance of a stock broker or other securities professional now independently manage their own portfolios.

A trader may notice reoccurring patterns in a market and place trades that capitalize on those patterns. By way of example, a trader may notice that every time the market closes up after a three-day low, the market will continue to climb. A sophisticated trader may view this occurrence as a buy opportunity to enter the market. In addition, a sophisticated trader will likely have an exit strategy for that particular trade. Various trading strategies may be based on market momentum, price, volume or time, or some combination thereof.

Traders develop trading strategies based on historical market data, experience and occurrences. Prior to the Internet, market data was available to traders mainly through satellite feeds, print media or television. Instant market data is now widely available from a variety of sources, including various web sites and on-line brokerage firms. Traders also develop trading strategies by recognizing patterns in the market. For example, if a trader recognizes that a particular security continually bottoms out at a price of $50 and routinely bounces back to a higher price, that trader will develop a trading strategy that will focus on buying that particular security at its bottom price and selling it at its peak price. Many trading strategies are mathematical in nature and depend on a variety of variables. Since trading strategies are implemented through a variety of variables, they are readily described by the use of algorithms. Therefore, trading strategies may be automated through the use of computer programs.

Currently, there does not exist a means to automate the process of back testing a trading strategy against historical market data and then apply that trading strategy to real time market data to automatically generate entry and exit orders with the changing conditions of real-time markets. By applying the rules of a new trading strategy to historical data through a computerized process, a computer can show the historical success of that strategy on the data in question. The trader can then better determine the likelihood of success of that strategy when it will be applied to real-time market trading. As a result, the trader can minimize the risk associated with the trade. Further, by applying a trading strategy to real time market data to automatically generate entry and exit orders with the changing conditions of real-time markets, a trader minimizes the risk of missing a trading opportunity for a particular strategy. Thus, it would be an improvement over the prior art to automate back testing and the application of trading strategies through the use of computers.

There is, therefore, a present need to provide an improved system and method for a trader to develop a trading strategy, back test the trading strategy on real market data and to automate the execution of the trading strategy with the changing conditions of real-time markets.

It is, accordingly, an object of the present invention to set forth an improved system and method for automating the monitoring and execution of trading strategies.

It is a further object of the present invention to generate entry and exit orders based upon the users' trading strategies and real-time market data.

It is further object of the present invention to provide the user with the ability to write trading strategies based upon market conditions and trends.

It is further object of the present invention to provide the user with the ability to write trading strategies in computer code for the automated execution of the trading strategy.

It is further object of the present invention to provide the user with the ability to write trading strategies and rules in English-like phrases and codes that are interpreted by a computer into an executable trading strategy.

It is a further object of the present invention to provide the user with market data and information to use in developing trading strategies.

It is further object of the present invention to automate the process of back testing trading strategies on real, historical market data.

It is a further object of the present invention to perform initial checks on generated entry and exit orders to determine if the order is restricted from being filled because of time, price or position restrictions.

It is a further object of the present invention for the computer coded trading strategies to be used in conjunction with real time market data to automate the placing of orders in accordance with the trading strategy.

In accordance with another aspect of the invention, it is a further object of the present invention to monitor the trading price of securities for which a user has an active order.

It is a further object of the present invention to automatically fill entry and exit orders based upon price restrictions when those restrictions are fulfilled.

In accordance with a further aspect of the invention it is a further object of the invention to constantly check the status of entry and exit orders on a pre-determined time interval.

It is a further object of the present invention to alert the user of the invention if the entry and exit orders have not been filled after a predetermined time.

In accordance with a further aspect of the invention it is a further object of the invention to automatically fill entry and exit orders as soon as market conditions change that make the orders become unrestricted.

In accordance with another aspect of the invention, it is a further object of the present invention to monitor market conditions affecting the users' trading strategies.

It is a further object of the invention to alert the user if an entry or exit order was not filled and the market conditions that triggered the order no longer exist.

In accordance with another aspect of the invention, it is a further object of the present invention to monitor the users' active trading strategies.

It is a further object of the invention to alert the user if an entry or exit order was not filled and the trading strategy that triggered the order is no longer active.

Finally, and in accordance with an additional aspect of the invention, it is a further object of the invention to modify entry and exit orders in accordance with the changing market conditions.

SUMMARY OF THE INVENTION

The present invention discloses a method and system to create and write a trading strategy, back test the strategy and automatically execute and monitor the strategy in an Internet-based trading environment. Upon occurrence of a market trigger condition, the automated process automatically generates entry and exit orders. A restriction check is also performed on the entry and exit orders. In addition, the invention allows the user to back test the trading strategy on real, historical market data prior to implementing the strategy for automatic execution.

A more complete appreciation of the present invention and the scope thereof can be obtained from the accompanying drawings which are briefly summarized below in the following detailed description of the presently-preferred embodiments of the invention and the appended claims.

BRIEF DESCRIPTION OF THE DRAWINGS

The objects, features and advantages of the present invention are readily apparent from the detailed description of the preferred embodiments set forth below, in conjunction with the accompanying Drawings in which.

DETAILED DESCRIPTION OF THE PREFERRED EXEMPLARY EMBODIMENTS OF THE PRESENT INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

Figure 1:
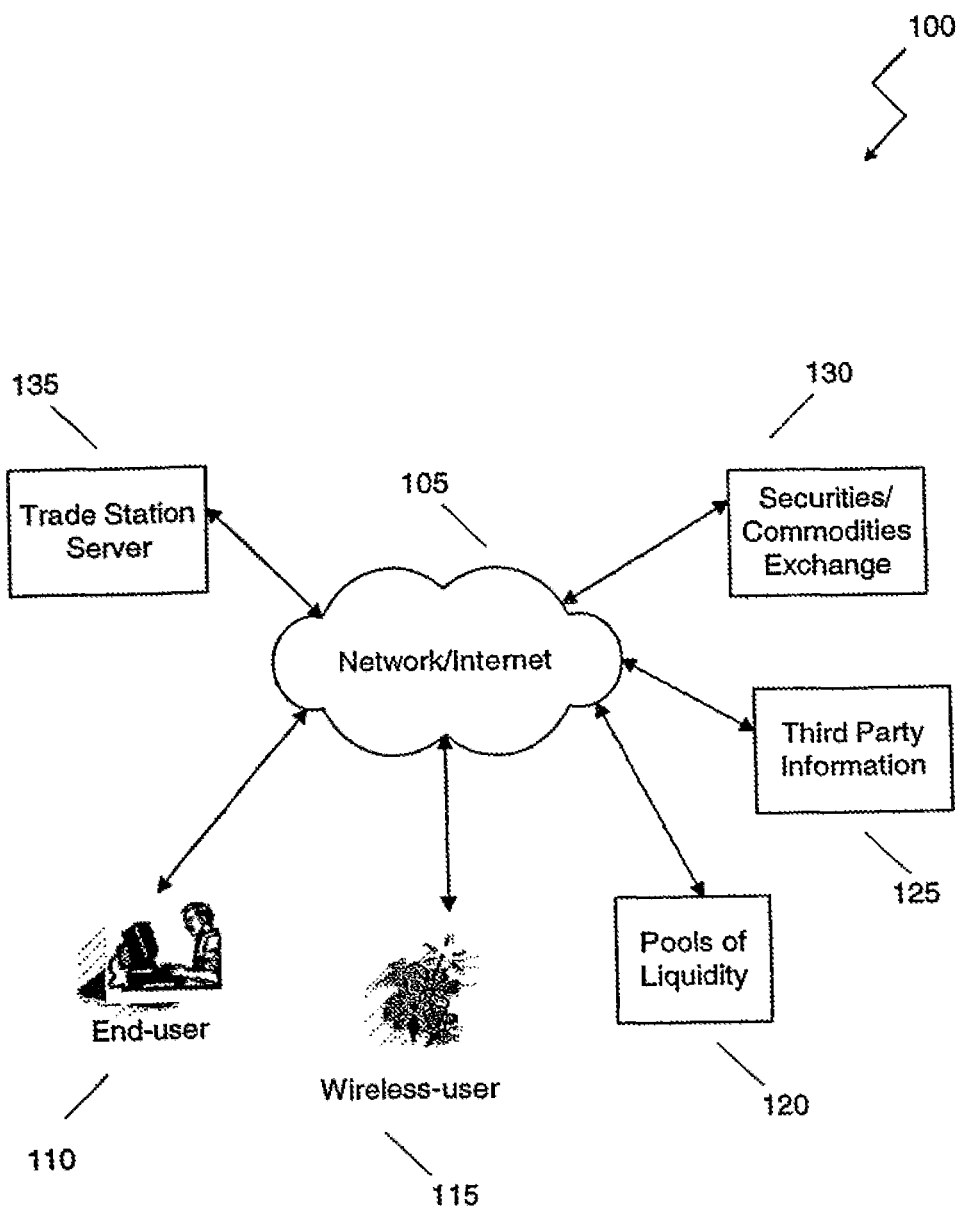
FIG. 1 is a diagram illustrating a network environment utilizing the principles of the present invention.

With reference now to FIG. 1 of the Drawings, there is illustrated therein a distributed computing network, generally designated by the reference numeral 100, utilizing the principles of the present invention. The various elements of the network are connected to each other via a network such as the Internet, indicated by the reference numeral 105. A computer, designated by reference numeral 110, represents a stand-alone user of the invention. It should be understood, however, that a user of the invention can instead be a wireless user 115, connecting to the network 105 via conventional telecommunications interfaces.

Other network elements include Pools of Liquidity 120 which may include Electronic Communication Networks (ECNs), Alternate Trading Systems (ATS), Market Makers and New York Stock Exchange Specialists. It should also be understood that a variety of third party information sources, generally designated by the reference numeral 125, may also be employed in the gathering of news events, market data and other information. Naturally, further sources of information are the various security and commodity exchanges 130 located throughout the world. Finally, a server or server farm 135 for performing the various financial calculations and managing the various accounts pursuant to the teachings of the present invention is also shown.

In operation, the user at their computer (collectively, "the user 110") creates a trading strategy to use for trading securities on his or her computer or wireless device 115. A unique aspect of the present invention is that the user 110 may choose a strategy that has already been created or the user may create his or her own new strategy. Additionally, the invention allows the user to write new trading strategies on their computer 110 or wireless device 115 in English-like phrases that an automation process translates into computer executable code.

The user 110 then applies the trading strategy to real, historical data and back tests the strategy. By back testing the strategy, the user can check to see if the strategy would have been successful when applied to the historical market data. The data for the back testing is preferably stored on the server farm 135 for simplicity. It should, of course, be understood, however, that the data may be dispersed across a number of computers or servers, whether within the server farm 135 or among more disparate and dispersed sources. In any event, the user 110 requests the data for a particular range of dates and symbols, and applies the trading strategy to the requested back data. Pursuant to the present invention, the user is then informed whether or not the trading strategy would have been successful on that historical data.

If the back test proves to be successful, the user 110 may then decide to apply the trading strategy to real-time market data and further test the strategy. The methodology of the present invention then automatically applies the rules of the trading strategy to the real-time market data, as discussed further hereinafter. The market data may come from the various stock exchanges 130, third party information sources 125 or Pools of Liquidity 120. When the restrictions of a strategy are fulfilled, the user 110 is then prompted. For example, if a particular trading strategy is based upon a price restriction, the strategy may call for placing a buy order for XYZ stock at $50. As soon as that restriction is fulfilled, the user 110 is alerted that the restrictions of the rule have been fulfilled. After testing the trading strategy on real-time market data, the user 110 may then decide to execute the strategy to perform real trades in the market.

A further unique aspect of the present invention is the ability to monitor factors that affect entry and exit orders and trading strategies and to automatically modify entry and exit orders to ensure that the users' orders are properly executed. Depending on changing market factors, the methodology of the present invention will automatically alter, cancel or change the status of entry and exit orders. For example, a user's trading strategy may be based upon a price restriction that calls for buying ABC stock when the price falls to $25. Thus, as soon as ABC falls to $25, the user is alerted that the restriction has been fulfilled and prompted to buy the security.

As soon as the user sends an entry or exit order into the network 105, the methodology of the present invention begins to continually monitor the status of the order. Oftentimes an entry or exit order is not filled for a variety of reasons. By way of example, by the time an order reaches the appropriate Pool of Liquidity 120, the price restriction may no longer be fulfilled. For instance, if a user placed an order to purchase ABC at $25 and by the time the order reached the Pools of Liquidity 120 the stock is no longer available at that price, the order is modified accordingly pursuant to the methodology of the instant invention. It should, of course, be well understood that it is not unusual for such occurrences to occur in a rapid trading environment. The system and methodology of the present invention preferably monitors all existing entry and exit orders and cancels or modifies orders so that all entry and exit orders are properly executed.

It should further be understood that the system and method of the present invention not only monitor external market conditions that occur at the stock exchanges 130 and Pools of Liquidity 120, but also monitor the trading strategies that are located on the various user devices, i.e., computers 110 or wireless devices 115. For example, a user may have an existing order to purchase 1,000 shares of XYZ stock that is sent to the market. In the meantime, the strategy that prompted the order might cancel or it might send an exit order or the user may close the strategy. The improved system and methodology of the instant invention preferably recognizes the strategy change, and modifies the order accordingly. For example, the case of a cancel, the order is pulled out of the market very quickly. In the case of the strategy generating an exit, a check is made whether or not the market has filled the entry. If the order is not filled, the order is canceled. If, however, the market has filled the entry, an exit order is placed. Further, if the user deletes or closes the strategy, the user is alerted that there is an existing order in the market.

A further unique aspect of the present invention is the ability to automatically execute trading strategies into entry and exit orders. As discussed above, a user may create a trading strategy or select a pre-defined strategy pursuant to the teachings of the present invention. Once the user has back tested the strategy and has begun to place trades in the markets with the strategy, the user may automate the process of monitoring the markets, strategies and orders for automatic placement of entry and exit orders based upon the users' trading strategy. For example, the user may create a simple strategy that buys ABC stock at $40 and sells the stock at $50. The user may automate the methodology to perform those trades without any direct action by the user, i.e., automatically buy ABC stock when it hits $40 and sell the stock when it reaches $50. It should, therefore, be understood that the system and methodology of the present invention are capable of fully automating the trading strategy once activated by the user. Alternatively, the user may not automatically place the trades, but instead may merely alert the user that the restrictions for a particular trading strategy are currently fulfilled and that there currently exists a trading opportunity.

Even though the above described examples are relatively simple strategies based upon elementary principles of buying and selling stocks for a profit, it is to be appreciated that the system and methodology of the present invention are capable of automating complex trading strategies that may be based upon intricate calculations of a number of different variables. Various inventive algorithms of the aforementioned automation processes of the present invention are discussed and explained in further detail in the following drawings and detailed description.

It should, of course, be understood that the automation process of generating and executing orders generates both entry orders and exit orders. Entry orders are generally buy or short orders, while exit orders are generally sell or cover orders. FIGS. 2-8 and accompanying text of the detailed description provide teachings and explanation of the automated process for entry orders. Similarly, FIGS. 9-15 and the accompanying text hereinbelow provide teachings and explanation of the automated process for exit orders generated by the automation process of the present invention.

Figure 2:
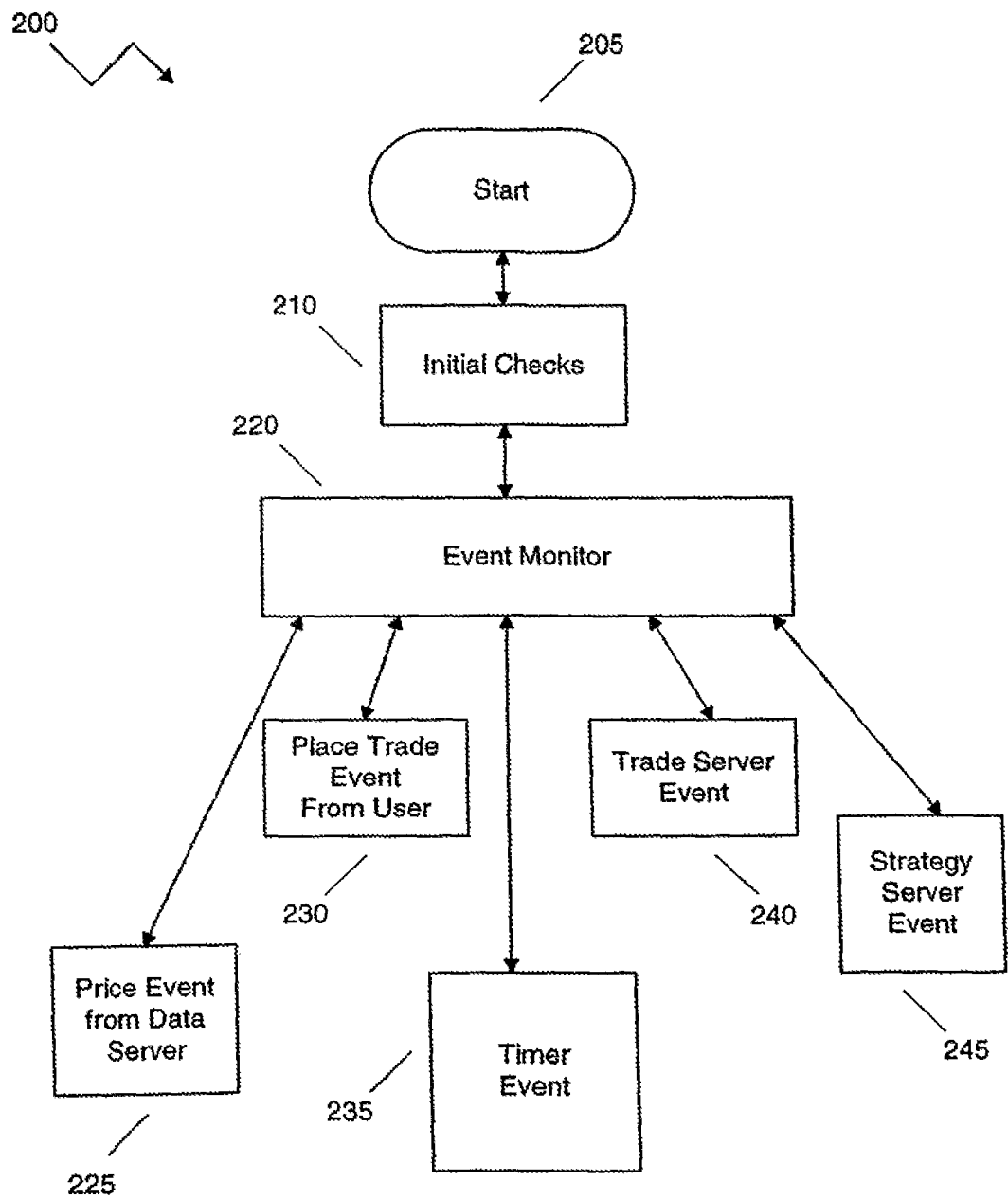
FIG. 2 is a high-level flowchart depicting the automation process for strategy entry orders of the present invention.

With reference now to FIG. 2 of the Drawings, there is illustrated a high-level flowchart depicting the automation process for strategy entry orders according to an embodiment of the present invention. It should be understood to one skilled in the art that each element of the flowchart represents a different module of the automation process, generally designated by the reference numeral 200, for entry orders that is described in more detail in the following drawings and detailed descriptions. The automation process 200 begins when a strategy entry order is triggered (step 205). Next, initial checks are performed on the order (step 210). Initial Checks 210 determines whether or not the order has any time, position, or price restrictions since a restricted order cannot be sent to the market. The automation process 200 described herein preferably holds the order until the restrictions are lifted and the order can be placed or the order expires. If the order is not restricted, the order will immediately be sent to the trade server, e.g., server 135 in FIG. 1, to be filled in the market. After Initial Checks 210, the order is added to an Event Monitor 220, where the order waits to be filled by changing market conditions.

With reference again to FIG. 2, there are illustrated various modules of the automation process, including a Price Event From Data Server 225, a Place Trade Event From User 230, a Timer Event 235, a Trade Server Event 240 and a Strategy Server Event 245. Price Event From Data Server 225, for example, receives all new orders from the Event Monitor 220 and determines if the orders can be filled in light of existing market conditions. The Place Trade Event From User 230 is a module of the automation process that performs internal checks on existing orders and determines if a restricted order has become unrestricted and can, therefore, be sent to be filled in the market. The Timer Event 235 is a module of the automation process that constantly monitors orders that have been placed into the market and alerts the users if their order is not yet filled. The Trade Server Event 240 is another module of the automation process that monitors orders once they have been placed into the market. For example, it is not unusual for an entry or exit order to only be partially completed by a Pool of Liquidity 120. The Trade Server Event 240 will alert the user of such an occurrence and modify the order in accordance with the trading strategy. Strategy Server Event 245 is a module of the automation process that monitors the trading strategies on the users' computer. Strategy Server Event 245 determines whether or not a particular trading strategy is still in use and whether the entry orders that were triggered by that trading strategy should be canceled or removed.

It is to be appreciated that an order goes through many different stages during its existence. When an order is generated by the trading strategy it is in a sending status. Once the trading server receives the order it is in a sent status. When a Pool of Liquidity 120 receives the order, it is in the received status. Various states may result after the Pool of Liquidity receives the order. The order may be filled and the order is then referred to as being in the filled state. It may be partially filled and the order is then referred to as being in a partially filled state. The trader may cancel the order and receive a UROut confirmation from the Pool of Liquidity 120. A UROut may also be in the form of a Partial UROut confirmation that is the result of a partially filled order. The order may be rejected by the Pool of Liquidity which would result in a rejected state. Similarly, an order may be in a canceled state if the trader or strategy canceled the order prior to it being filled. And, the order may also be described as being in an expired state if the Pool of Liquidity 120 did not fill the order before the market closed.

Figure 3A:
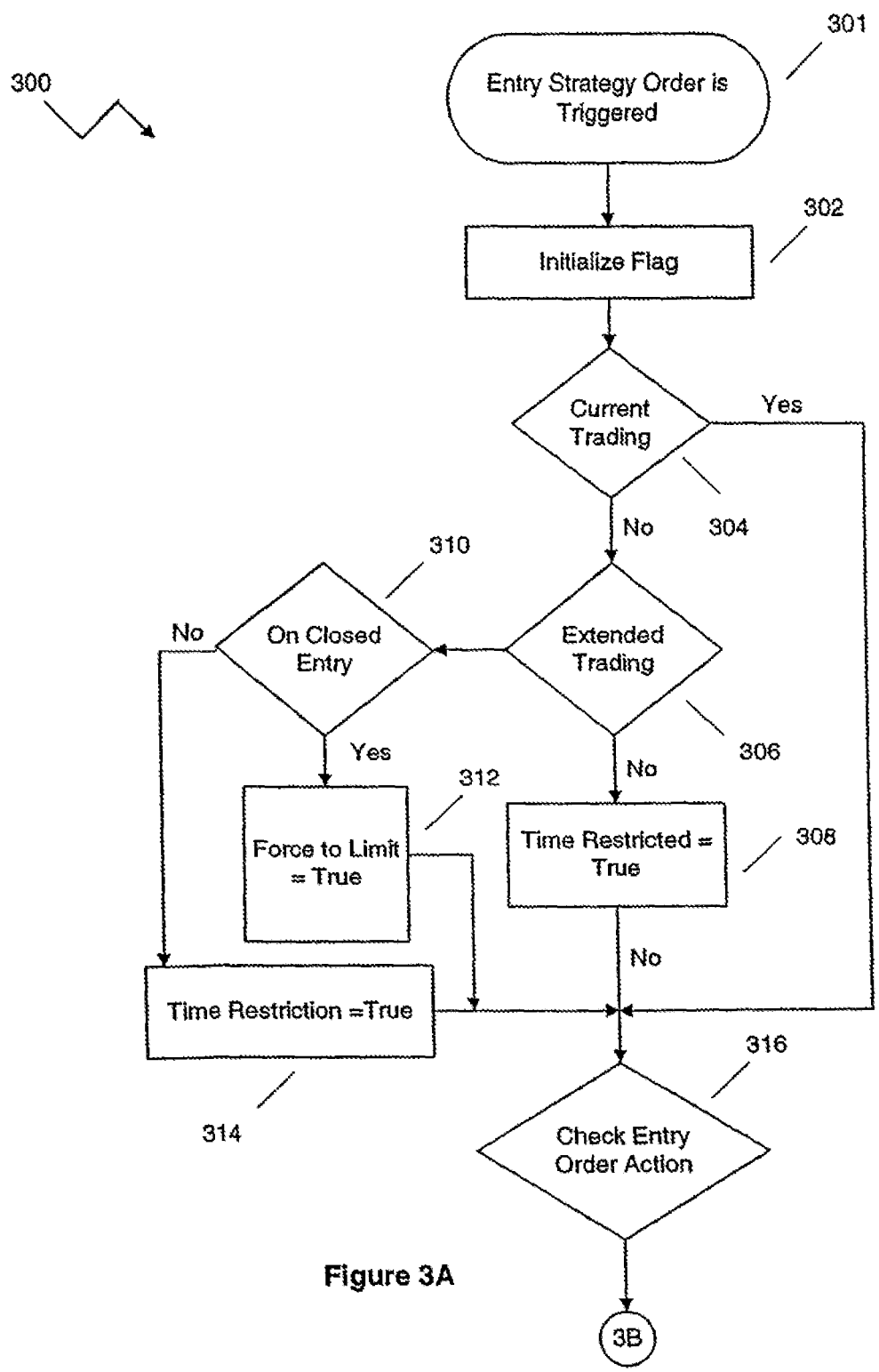
FIG. 3 is a flow chart that depicts the process and methodology of the Initial Checks module for entry orders.
Figure 3B:
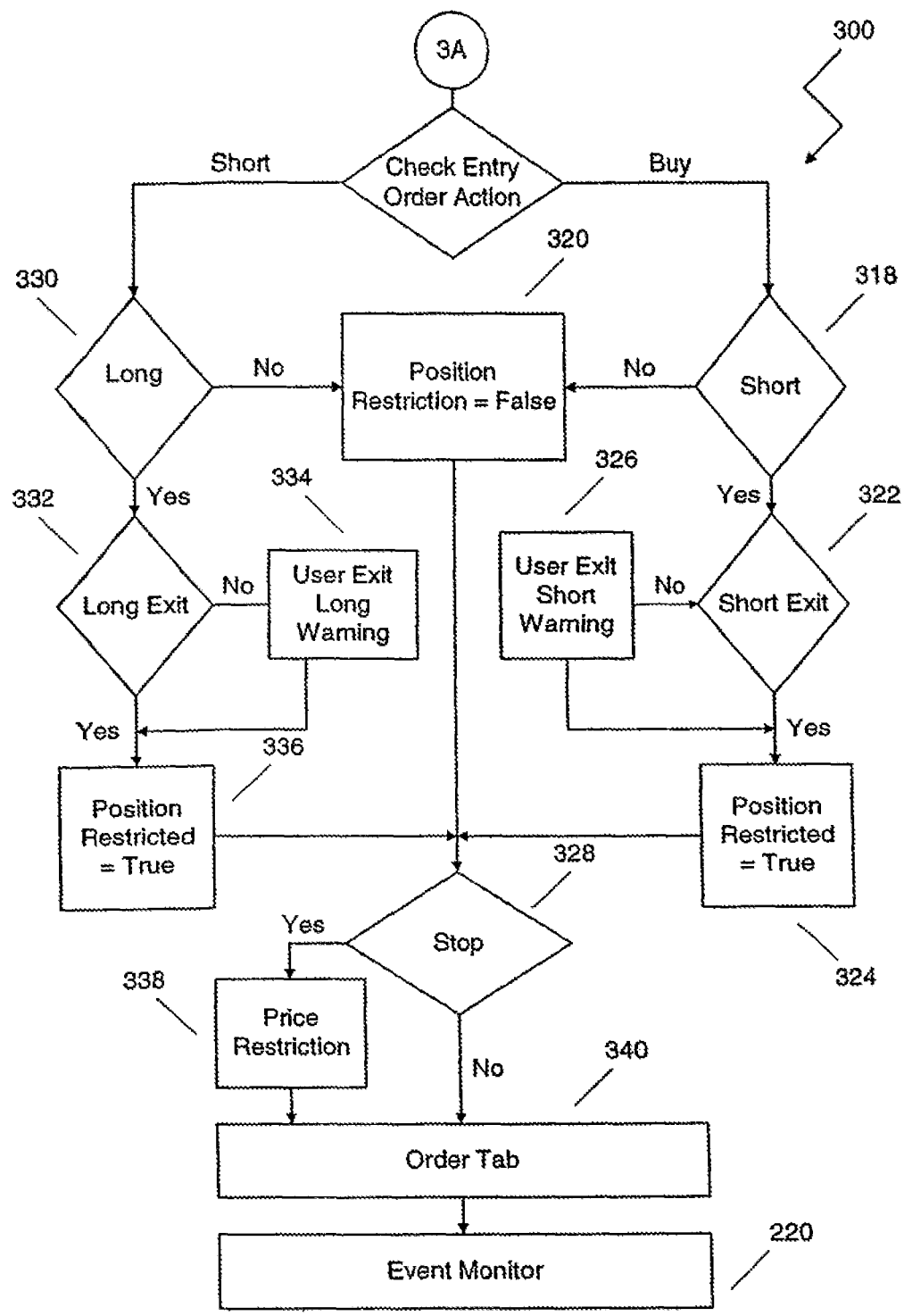

With reference now to FIGS. 3A and 3B, there is illustrated a flow chart that depicts the process and methodology of the Initial Checks module 210 in FIG. 2 in more detail. The algorithm for the Initial Checks module 210, generally designated in FIGS. 3A and 3B by the reference numeral 300, begins (step 301) where a strategy order to buy or short is triggered. The order then passes to an Initialize Flags routine (step 302), where various flags, that help monitor the order throughout the automation process, are set to their default value. As is understood to one skilled in the art, the flags indicate whether or not a particular order is restricted from being sent to the market. For example, a trader may put in an order to buy XYZ stock once it drops to $50. The system and methodology of the present invention recognizes this restriction and sets a Price Restriction Flag to TRUE. Once the price of XYZ drops to $50, the price restriction is removed and the Price Restriction Flag is set to FALSE. If a particular order has any restrictions, it will not be sent to the market and, therefore, will not be filled.

As discussed, the Initialize Flags 302 routine initializes the flags to their default settings. A Trade Server Status variable is, for example, initialized to Unsent. The phrase "Trade Server Status" describes the status of an order, and can be one of the following values: un sent (the order has not been sent from the user to the Trade Server), sending (the order is sent to Trade Server but an acknowledgement is not yet received), sent (the Trade Server has received the order), received (the Trade Server has routed the order to the appropriate market participant (Pool of Liquidity, Market Maker, NYSE Specialist, etc.)), filled (the market participant has totally filled the order), partially filled (Alive) (the market participant has partially filled the order and the order is still active) partially filled (UROut) (the market participant has partially filled the order but the order is no longer active), cancel pending (the user has cancelled the order but the order is still active), UROut (the user has cancelled the order and the order is no longer active), TooLateToCancel/Cancel, Rejected (the user has cancelled the order but the order was already filled), expired (the order is no longer active due to time limitations), and rejected (the Pool of Liquidity was unable to accept the order). Each of the above possible status settings will be analyzed in more detail hereinbelow.

A Strategy Status Flag is initially set to unfilled. The Strategy Status is the state of a strategy order within the methodology of the present invention, and can be one of the following values: active (the initial state of an order that is generated by a trading strategy), filled (the state of a strategy order when it is determined that the market would have filled the order), cancelled (the state of an order when the strategy has determined that the order is no longer valid) and deleted (the state of an order when the strategy that generated this order is no longer running).

A Price Restricted Flag is initially set to FALSE. The Price Restricted Flag is preferably a Boolean Flag that is used to hold an order until a certain price is reached. It is used to implement stop orders. Likewise, a Time Restricted Flag is a Boolean flag initially set to FALSE, and is used to hold an order until a certain time is reached. The Time Restricted Flag is for orders that are generated during non-trading hours that should be placed when the market opens. A Position Restricted Flag is another Boolean flag initially set to FALSE, which is used to hold an order until a flat (neutral) position is reached. For example, the Position Restricted Flag may be used to hold long entry orders from being placed if a short position exists.

A Multiple Exit Restricted Flag is still another Boolean Flag initially set to FALSE and is used to hold an exit order that would otherwise result in a greater exit quantity than entry quantity. A Multiple Entry Restricted Flag is a Boolean Flag initially set to FALSE that is used to hold an entry (long or short) order that, if placed and filled, would result in a box position. Box positions occur when there are both long and short positions in a security simultaneously.

A Pending UROut Flag is a Boolean Flag initially set to FALSE and is used to hold an exit (sell or cover) order while waiting for another previously placed exit order to be cancelled. A Pending Position Update Flag is another Boolean Flag initially set to FALSE that the invention uses to treat filled orders as open orders until the position has updated. The Pending Position Update Flag is necessary since the methodology of the instant invention does not simultaneously notify the user that an order has been filled and that there is new position information.

A Force to Limit Flag is a Boolean flag initially set to FALSE and is used to notify the user that an entry or exit order has been generated but entry or exit orders are no longer accepted, and the order can only be placed as a limit order. Finally, a Warn if Unfilled Flag is yet another Boolean flag initially set to FALSE and is used to notify the user that a strategy order has been filled by the strategy but has not yet been filled by the market. It should, of course, be understood to one skilled in the art that the various flags enumerated above, although preferably of Boolean type, may be of another type, e.g., integer, which corresponds to a true and false setting, e.g., zero and non-zero.

Returning now to the methodology illustrated in FIGS. 2, 3A and 3B, the Initial Cheeks Module 210 determines if there are any time restrictions on the order that was generated by the trading strategy, e.g., by perusal of the status of the Time Restricted Flag. The order is then passed from Initialize Flags 302 to a current trading decision node 304, where it is determined whether or not the order was triggered in the current regular trading session. If the order was triggered in the current regular trading session, control is passed to a Check Entry Order Action 316, described in more detail hereinbelow. If, however, the order was not triggered in the current regular trading session, control then passes to an extended trading decision node 306, where it is determined if the order was triggered in a current extended trading session. If the order was not triggered in the current extended trading session, the aforementioned Time Restricted Flag is set to TRUE (step 308), and the order is passed to the Check Entry Order Action 316. If, however, the order was triggered during the extended trading session, the order is passed to an On Close Entry decision node 310, where it is determined if the order is an On Close Entry Order.

"On close" orders are orders that are executed at the close of a bar or the close of the market at the end of the day. If the order closes on the last bar of the day, then the order can no longer be placed in the regular market and the user is informed that that the order can only be placed in the extended session. If the order is an On Close Entry Order, then a Boolean flag for Force to Limit is set equal to TRUE (step 312), and the order is then passed to the aforementioned Check Order Entry Action 316. If, however, the order is not an On Close Entry Order, the Time Restricted Flag is set to TRUE (step 314), and the order is also passed to the Check Entry Order Action 316.

With reference now to FIGS. 2 and 3B, the Initial Checks Module 210 next determines if there are any position restrictions on the order that was generated by the trading strategy. In particular, the Check Entry Order action 316 determines whether the order is a buy order or a short order. If it is determined that the order is a buy order, the order is passed to a short decision node 318, where it is determined if there is a short position or an open short order for the stock symbol in the account manager. If there is not a short position or an open short order for the stock symbol in the account manager, the aforementioned Position Restricted Flag is set to FALSE (step 320) and the order is passed to a Stop Order 328. An "open order" is defined as having a Trade Server State of "sending", "sent", "received", "cancel pending" or "filled/partially filled (alive)" with a Pending Position Update set equal to TRUE. If there is a short position or an open short order for the stock symbol in the account manager (decision node 318), the order is passed to a short exit decision node 322, where it is determined whether there are short exit orders for the strategy with enough quantity to close the short position. If there are short exit orders for the strategy with enough quantity to close the short position, then the Position Restricted Flag is set to TRUE (step 324) and the order is then passed to the aforementioned Stop Order 328. If, however, there are no short exit orders for the strategy with enough quantity to close the short position, the order generated by the strategy will be placed. The Position Restricted Flag is then set to TRUE (step 324), and the order is passed to the Stop Order 328.

Returning now back to the aforementioned Check Entry Order Action 316, if Check Entry Order Action 316 determines that the order is a short order, the order is then passed to a long decision node 330, where it is determined if there is a long position or an open long order for this symbol in the account manager. If there is not a long position or an open long order for this symbol in the account manager, the Position Restriction Flag is set to FALSE (step 320), and the order is passed to the Stop Order 328, as described hereinabove. If it is determined there is a long position or an open long order for this symbol in the account manager, then the order is passed to a long exit decision node 332, where it is determined whether or not there are any existing long exit orders for the strategy with enough quantity to close the long position. If there are existing long exit orders for the strategy with enough quantity to close the long position, the Position Restricted Flag is set to TRUE (step 336), and the order is passed to the Stop Order 328. If there are no existing long exit orders for the strategy with enough quantity to close the long position, the user is warned that they must manually exit the long position before the short entry order generated by the strategy will be placed (step 334). The Position Restricted Flag is then set to TRUE (step 336), and the order is passed to the Stop Order 328.

Next, the Initial Checks Module 210 determines if there are any price restrictions on the order that was generated by the trading strategy. Stop Order 328 determines if the order is a stop order. If the order is a stop order, the buy price restriction is set to execute the trade if the trading price is less than the stop price, or the short price restriction is set to execute the user is warned (step 326) that they must manually exit the short position before the long entry trade if the trading price is greater than the stop price (step 338). The order is then passed to an order tab node 340, where the order is added to the account manager and the Check for Multiple Entries Module is called. The process of checking for multiple entries is described in more detail hereinbelow. If, however, Stop Order 328 determines that the order is not a stop order, then the order is passed directly to the aforementioned order tab 340, where the order is added to the account manager and the order is checked for multiple entries. The order then passes to the aforementioned Event Monitor 220, discussed in connection with FIG. 2.

Figure 4:
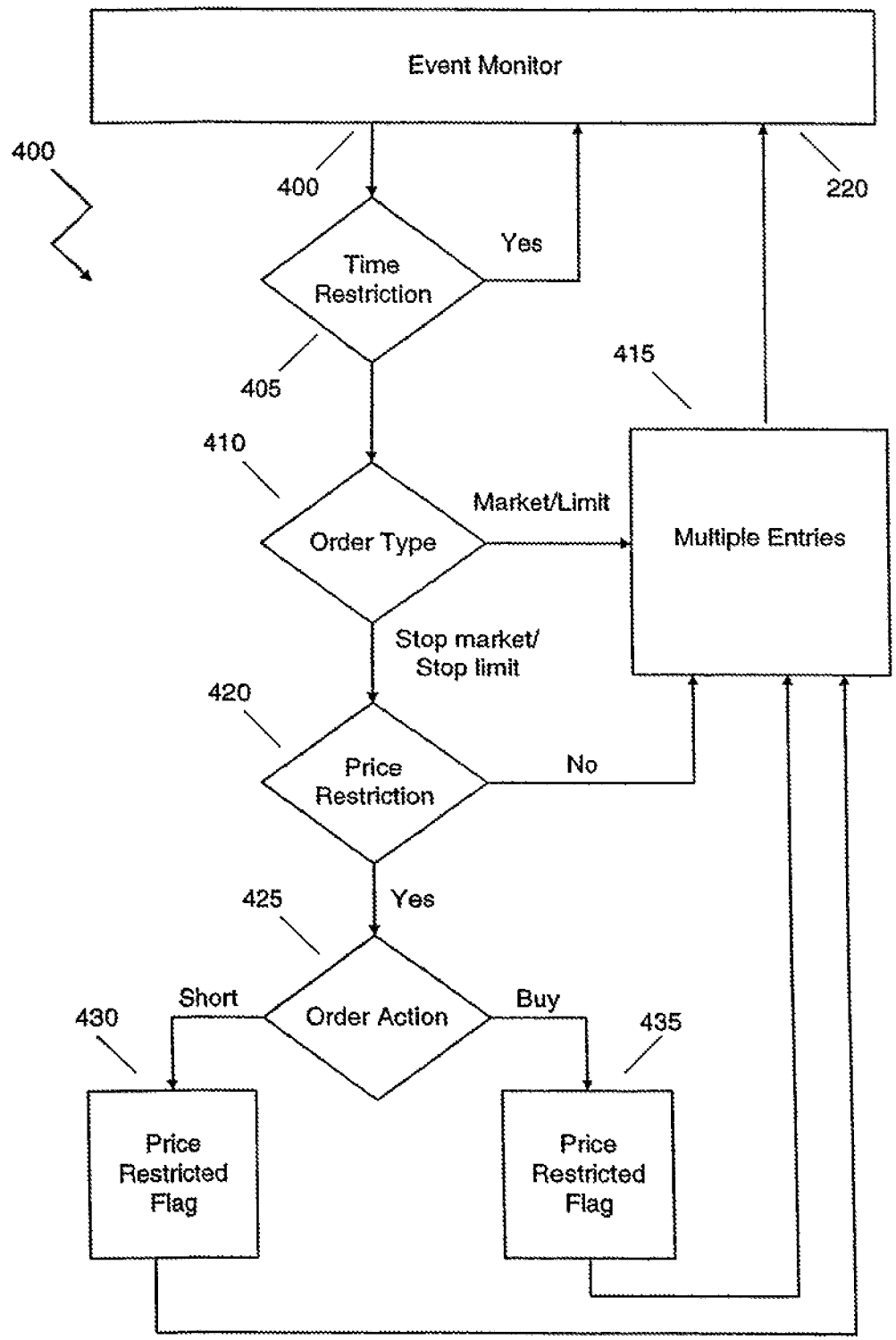
FIG. 4 is a flow chart that depicts the process and methodology of the Price Event from Data Server module for entry orders.

With reference now to FIG. 4, there is illustrated a flow chart depicting the process and methodology of the Price Event from Data Server module 225 illustrated in FIG. 2. The methodology of the Price Event from Data Server module 225, generally designated in FIG. 4 by the reference numeral 400, starts where an order to buy or short is received from the Event Monitor 220. The Price Event from Data Server module 225 first determines if the order is time restricted (decision node 405). If the order is time restricted, the order is returned to the Event Monitor 220, as illustrated. If, however, the order is not time restricted, then the order is passed to an order type decision node 410, where the order type is determined. For example, if the order is a market or limit order, then the order is passed to a Check for Multiple Entries node 415. If, however, the order is a stop market or stop limit order, the order is instead passed to a price restriction decision node 420, where it is determined if the order is price restricted. If the order is not price restricted, then the order is passed to the aforementioned Check for Multiple Entries node 415. If, however, the order is price restricted, the order is passed to an order action node 425, where the order action is determined. If the order action is to short, then the order is passed to a short node 430, where if the trade price is less than or equal to the stop price, the Price Restricted Flag is set equal to FALSE. If, however, the order action is to buy, then the order is passed to a buy node 435, where if the trade price is greater than or equal to the stop price, then the Price Restricted Flag is set equal to FALSE. The orders from both nodes 430 and 435 are then passed to the aforementioned Check for Multiple Entries node 415. All orders sent to the Check for Multiple Entries node 415 are then returned to the Event Monitor 220.

Figure 5:
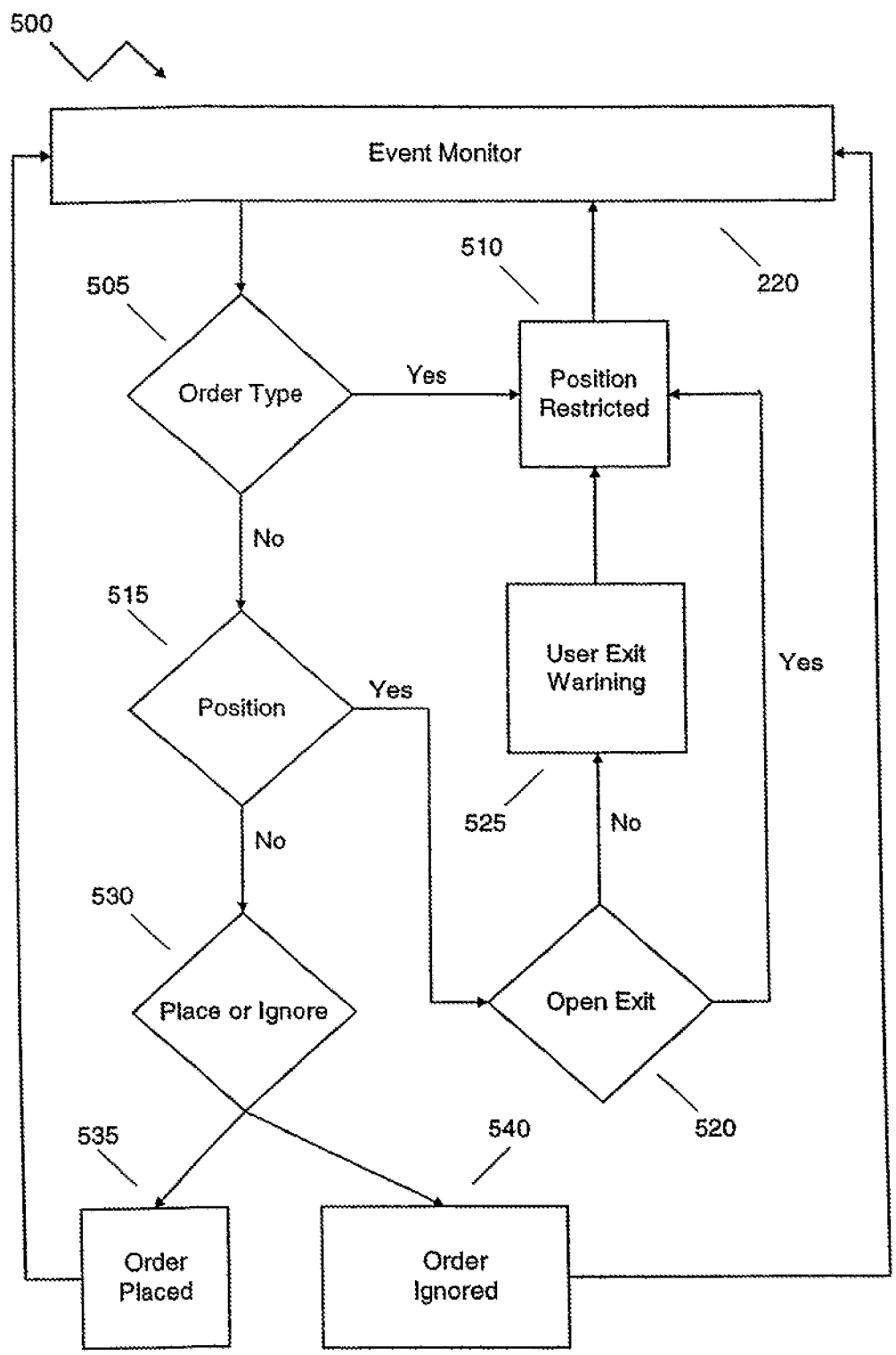
FIG. 5 is a flow chart that depicts the process and methodology of the Place Trade Event module for entry orders.

With reference now to FIG. 5 of the Drawings, there is illustrated a flow chart depicting the process and methodology of the Place Trade Event module 230 illustrated in FIG. 2. The methodology of the Place Trade Event module 230, general designated in FIG. 5 by the reference numeral 500, starts where a non-restricted unsent order is received from the Event Monitor 220 at an order decision node 505, where it is determined whether there is an existing long order for a short entry or a short order for a long entry for the stock symbol. If it is determined that there is an existing long order for a short entry or a short order for a long entry for the stock symbol, control is passed to a short-long node 510, where the Position Restricted Flag is set to TRUE. The order is then returned to the aforedescribed Event Monitor 220. If, however, it is determined that there is not an existing long order for a short entry or a short order for a long entry for the stock symbol in the account manager, then the order is passed to position decision node 515, where it is determined whether there is an existing long position for a short entry or a short position for a long entry for the symbol. If there is an existing long position for a short entry or a short position for a long entry for the symbol in the account manager, control is passed to an open exit decision node 520, where it is determined if there is an open exit order that that would close the position. If there is not an open exit order that that would close the position, the user is warned (step 525) that they must manually exit the long/short position before the short/long entry order generated by the strategy will be placed. The Position Restricted Flag is then set equal to TRUE (step 510) and the order is returned to the Event Monitor 220. Returning now to the position decision node 515, if it is determined that there is not an existing long position for a short entry or a short position for a long entry for the symbol in the account manager, the user is asked to either place or ignore the order (step 530). If the user indicates order placement, the order is placed (step 535), where the order is sent to the trade server. If the user ignores the order (step 540), the order's Trade Server Status is set to ignored and control is returned to the Event Monitor 220.

Figure 6:
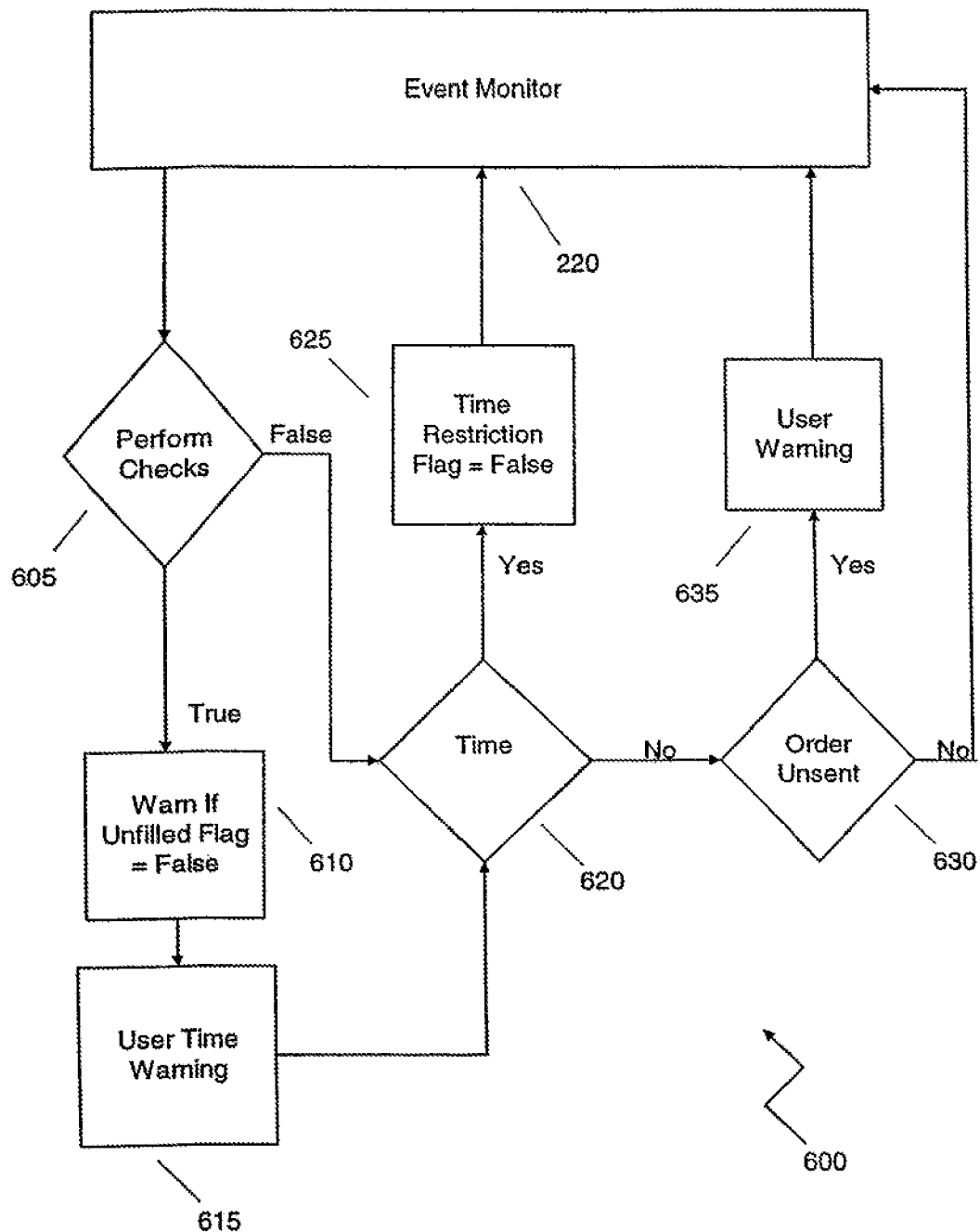
FIG. 6 is a flow chart that depicts the process and methodology of the Timer Event module for entry orders.

With reference now to FIG. 6, there is illustrated a flow chart that depicts the process and methodology of the Timer Event module 235 illustrated in FIG. 2. The methodology of the Timer Event module 235, generally designated in FIG. 6 by the reference numeral 600, constantly monitors orders that have been placed into the market and alerts the users if their order is not yet executed by the Pool of Liquidity 120. The Timer Event module methodology 600 begins by checking (step 605) if 1) the Strategy Status flag is filled, and 2) the Trade Server Status is unfilled, and 3) the current time (strategy filled time) is greater than a predetermined amount of time, and 4) the Warn if Unfilled Flag is TRUE, and 5) it is during market hours, and 6) the order is not ignored. If the above criteria are all TRUE, then the entry order's Warn if Unfilled Flag is set to FALSE (step 610) and the user is then warned that a predetermined amount of time has passed since notification to place the order and that the strategy has filled the entry order, but the order has not been filled by the market (step 615).

Control is then passed to a time decision node 620, where it is determined whether or not the current time is in a regular trading session. If the current time is in a regular trading session, the order's Time Restriction Flag is set to FALSE (step 625) and the order is returned to the Event Monitor 220. If the current time is not in a regular trading session (step 620), it is determined whether the order is unsent and filled by the strategy (step 630). If the order is unsent and filled by the strategy, the user is warned (step 635) that the strategy has filled the order, but the market is now closed and the order is unsent and the order will be set to ignored. Further, the user will be given the option to place the order in the extended trading session, as discussed hereinabove. The order is then returned to the Event Monitor 220. Returning now to step 630, if the order is not unsent and filled by the strategy, it is returned to the Event Monitor 220. Returning to the perform checks decision node 605, if any of the aforementioned criteria are FALSE, control transfers to the time decision node 620, and continuing thereafter as described hereinabove.

Figure 7A:
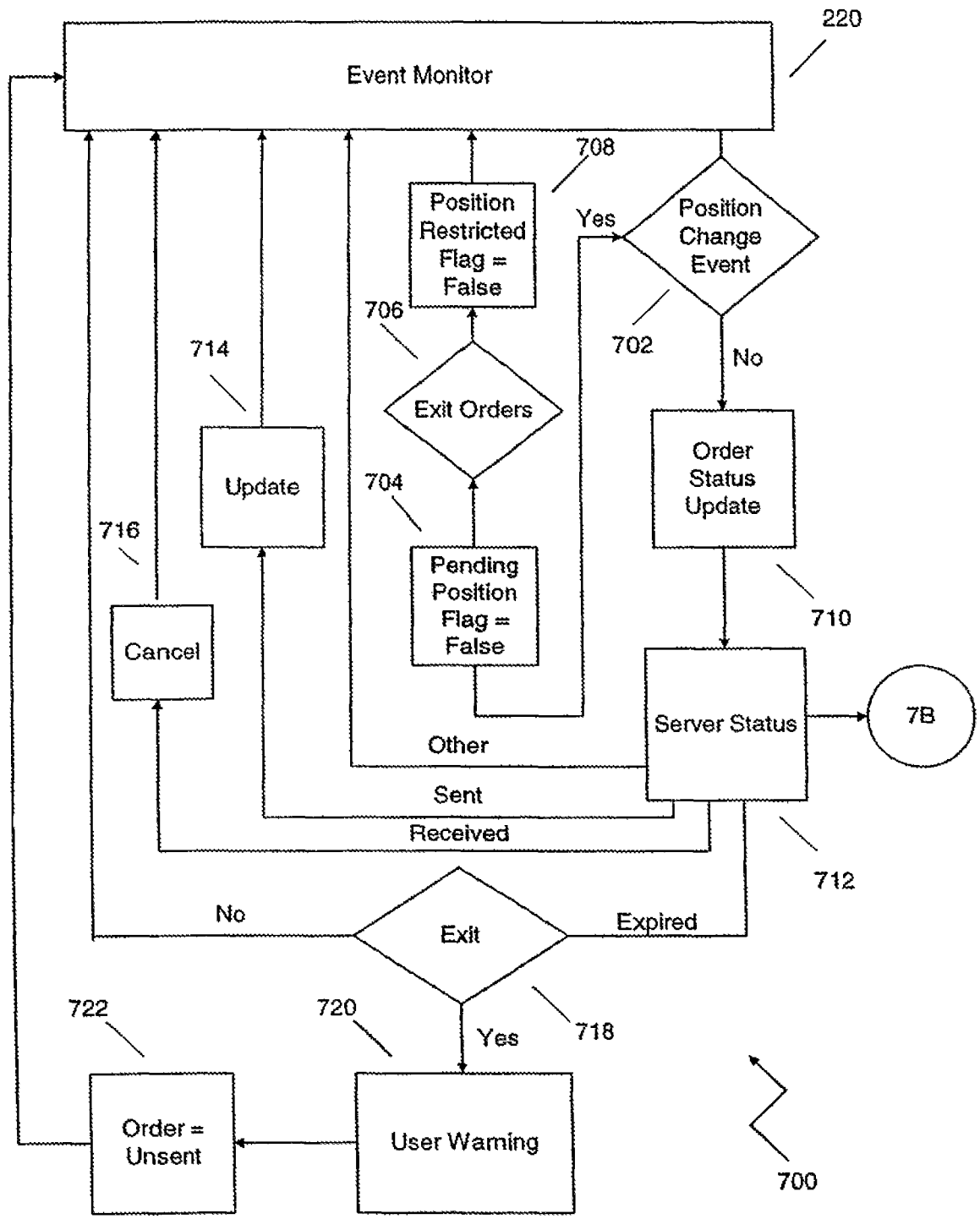
FIG. 7 is a flow chart that depicts the process and methodology of the Trade Server Event module for entry orders.
Figure 7B:
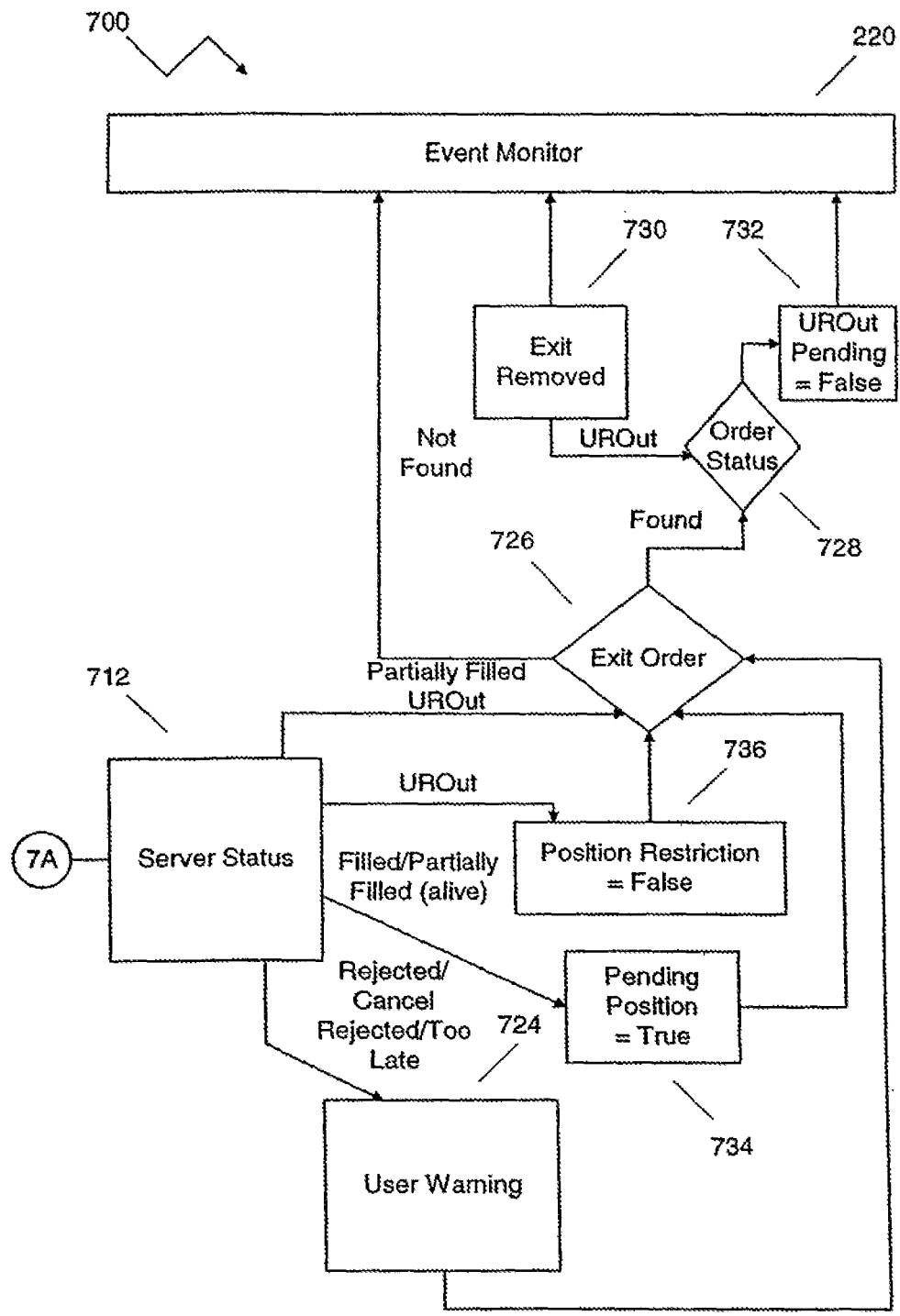

With reference now to FIGS. 7A and 7B, there is illustrated a flow chart that depicts the process and methodology of the Trade Server Event module 240 illustrated in FIG. 2. The methodology of the Trade Server Event module 240, generally designated by the reference numeral 700, monitors entry orders once they are placed into the market stream. The Trade Server Event module methodology 700 begins by determining whether the event is a position changed event for the order (step 702). A "position changed event" occurs when a trader's position for a stock changes. For example, a user of the present invention may have a certain position in a particular stock symbol and orders for that same symbol that are restricted because of their position. A position change event occurs when the restrictions on those orders may be lifted due to a change in the position in the symbol. If the incoming event is a position changed event, the Pending Position Flag is then set to FALSE (step 704). Next, matching exit orders are referenced (step 706) and the order's Position Restricted Flag is set to FALSE (step 708) before returning the order to the Event Monitor 220, as illustrated.

Returning back to step 702, if it is determined that the order received from the Event Monitor 220 is not a position changed event, the order is instead passed to an order status update node 710 where the entry's Trade Order Status is updated. The order is then passed to a server status decision node 712, where the invention checks the entry order's Trade Server Status. If, for example, the order's Trade Server Status is "sent," control is passed to an update node 714, where the methodology of the present invention updates the trade server sequence number before returning control back to the Event Monitor 220, as illustrated. If the order's Trade Server Status is "received," control is instead passed to a cancel node 716, which sends any cancel orders that were queued up during the sending state.

Returning again to the server status decision node 712, if it is determined that the order's Trade Server Status is "expired," control is passed to an exit decision node 718, where it is determined whether a corresponding exit order was filled by the strategy. If it is determined that a corresponding exit order was not filled by the strategy, control is returned to the Event Monitor 220, as illustrated in FIG. 7. If, however, it is determined that a corresponding exit order was filled by the strategy, the user is warned (step 720) that the strategy has filled the order but the market is closed and the order is expired. The user is then given the option of placing the order in the extended trading session. Next, the order is time restricted and order's state is changed to unsent (step 722) before returning the order to the Event Monitor 220.

With reference now to FIG. 7B and returning again to the server status decision node 712, if it is determined that the order's Trade Server Status is "rejected", "cancel rejected" or "too late", the user is warned (step 724) that a strategy order that he placed has been rejected or is too late before the order is passed to an exit order decision node 726, where matching exit orders are referenced. If no matching exit orders are found, the order is returned to the Event Monitor 220, as illustrated. If, however, matching exit orders are found, the order is passed to an order status decision node 728, where the status of the order is determined. If the order status is UROut and UROut Pending is set equal to TRUE, the exit order is removed (step 730) before returning the order to the Event Monitor 220. If, however, it is determined at the order status decision node 728 that the order status is filled, canceled, rejected, too late or partial fill (UROut), then exit orders with UROut Pending set equal to TRUE will be set equal to FALSE (step 732) before returning the order to the Event Monitor 220.

With further reference to the server status decision node 712, if it is determined that the order's Trade Server Status is "filled" or "partially filled", then the Pending Position update flag is set to TRUE (step 734) before the order is passed to the aforedescribed exit order decision node 726, where matching exit orders are referenced. As discussed hereinabove, if no matching exit orders are found, the order is returned to the Event Monitor 220. If, however, matching exit orders are found, the order is passed to the order status decision node 728, where the automation process for the Trade Server Event module continues as described above.

Returning again to the server status decision node 712, if it is determined that the status of the entry order is "UROut", then the Position Restricted Flag is set to FALSE (step 736) if there is a short or long entry position and no open short or long entry orders exist, the current position is flat and there exists restricted long or short entry orders. The order is then passed to the exit order decision node 726, where matching exit orders are referenced, as described above. If no matching exit orders are found, then the order is returned to the Event Monitor 220. If matching exit orders are found, the order is passed to step 728, where the automation process for the Trade Server Event module continues as described above.

With reference again to the server status decision node 712 in FIG. 7B, if it is determined that the status of the entry order is "partially filled (UROut)", then the order is then passed to the aforedescribed exit order decision node 726, where matching exit orders are referenced. If no matching exit orders are found, then the order is returned to the Event Monitor 220. If matching exit orders are found, the order is passed to step 728, where the automation process for the Trade Server Event module continues as described above.

With final reference to the server status decision node 712 in FIG. 7A, if it is determined that the status of the entry order is not one of the enumerated defaults mentioned above, then the status is recognized as "other" and the order is returned to the Event Monitor 220, as illustrated (step 738).

Figure 8A:
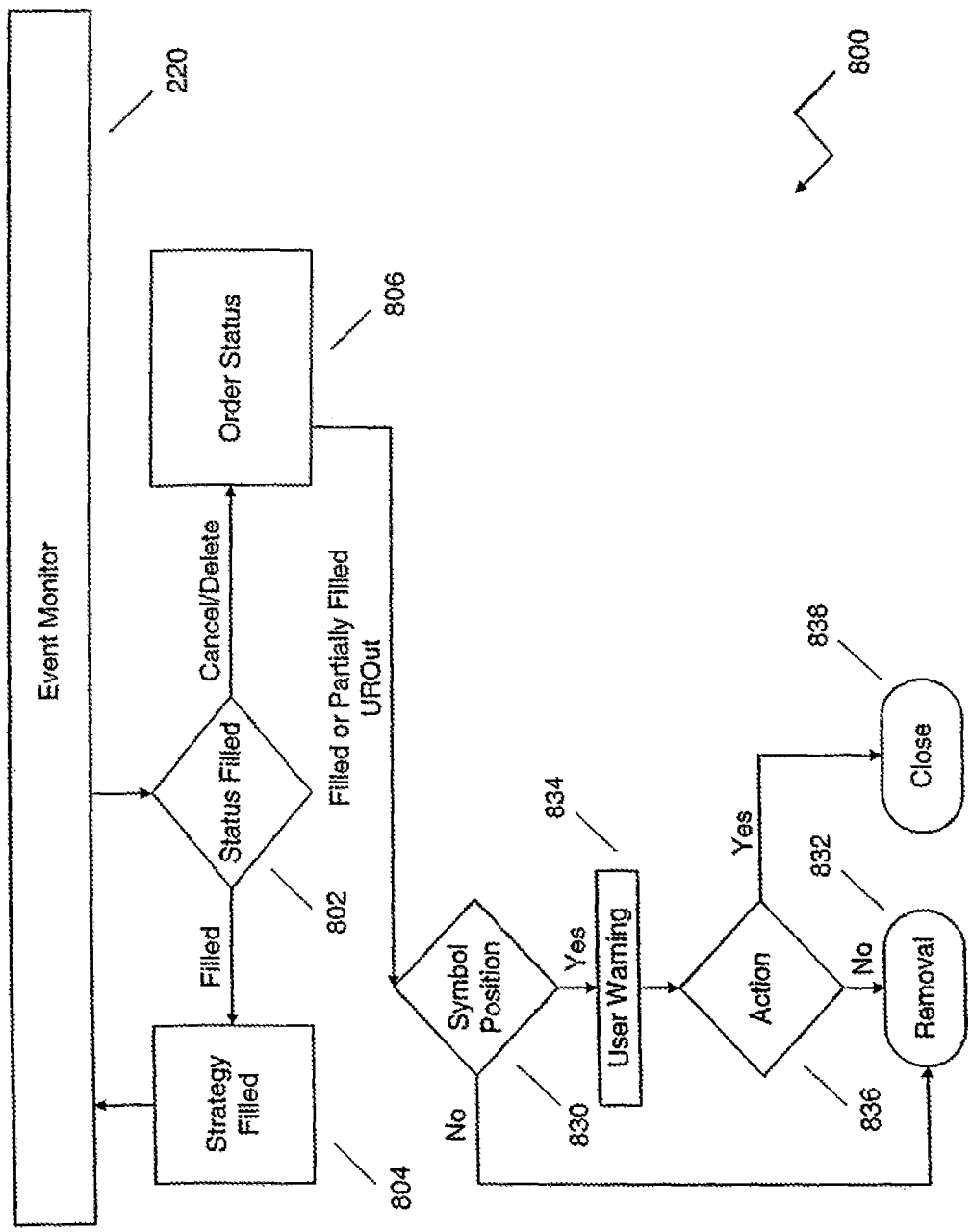
FIG. 8 is a flow chart that depicts the process and methodology of the Strategy Server Event module for entry orders.
Figure 8B:
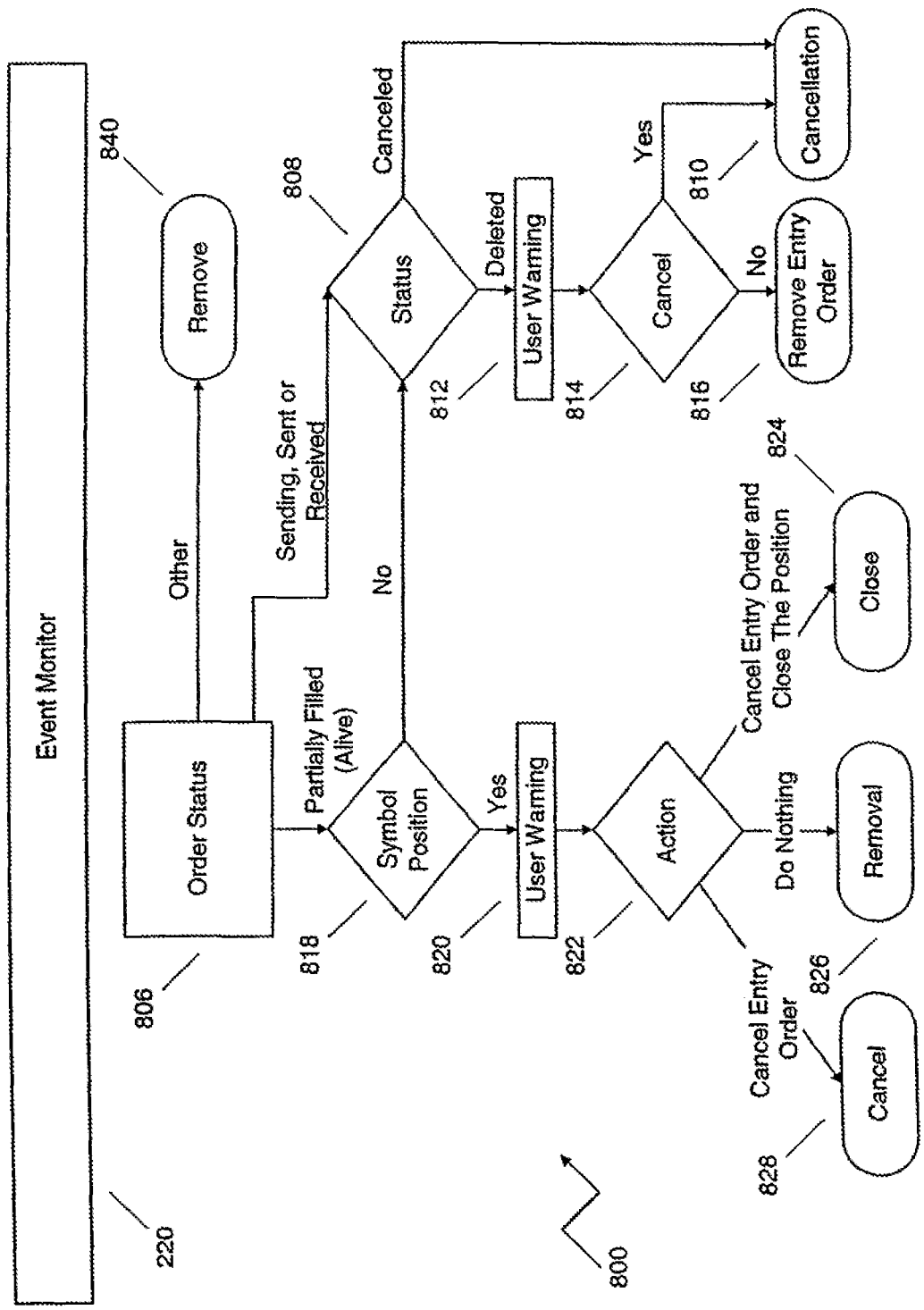

With reference now to FIG. 8A and FIG. 8B of the Drawings, there is illustrated a flow chart that depicts the process and methodology of the Strategy Server Event module 245 illustrated in FIG. 2. The methodology of the Strategy Server Event module, generally designated by the reference numeral 800, monitors the trading strategies on the users' computer or wireless device, determines whether or not a particular trading strategy is still in use, and determines whether the entry orders that were triggered by the trading strategy should be canceled or removed.

The methodology of the Strategy Server Event module begins with a check of the entry order's Strategy Server Status (step 802). If the entry order has been filled by the strategy, the entry order's Strategy Status is set to filled and the Strategy Filled Time is set to the current time (step 804). Control is then returned to the Event Monitor 220, as illustrated in FIG. 8A.

With reference again to the status check (step 802), if it is determined that the order has been cancelled or deleted by the strategy, then the order is passed to an order status decision node 806, where the order status is checked in the trade server. If it is determined that the status of the order is "sending", "sent", or "received", control is passed to a cancellation decision node 808, as illustrated in FIG. 8B, where it is determined whether the order was deleted or canceled. If the order was "canceled", control passes to a cancellation node 810, where the methodology of the present invention removes the entry order, adds a cancel order, or queues a cancel order, as is understood to those of skill in the art. If, however, it is determined that the order in cancellation decision node 808 was deleted, the user is warned that a strategy that they were tracking is no longer running and that there is an open order (step 812) and control is transferred to a second cancellation decision node 814. If at the aforementioned second cancellation decision node 814 the user cancels the order, control is passed to the aforementioned cancellation node 810, where the methodology of the present invention removes the entry order, adds a cancel order, or queues a cancel order, as discussed. If the user does not cancel the order at the second cancellation decision node 814, the entry order is removed (step 816).

With reference again to the order status decision node 806 in FIG. 8B, if it is determined that the entry order status is partially filled, control passes to a position decision node 818, where it is determined whether there is a position from the entry for that particular symbol. If there is no position from the entry for that particular symbol, then the user is warned (step 812) that a strategy that they were tracking is no longer running and that there is an open order. If the user thereafter cancels the order at the second cancellation decision node 814, control passes to the aforementioned cancellation node 810, where the automation process removes the entry order, adds a cancel order, or queues a cancel order. If, however, the user does not cancel the order, control instead passes to step 816, where the automation process removes the entry order, as discussed hereinabove.

Returning now to the position decision node 818, if it is determined that there is a position from the entry for that particular symbol, the user is warned (step 820) that a strategy they were tracking is no longer running or is cancelled but there is an open order that has been partially filled. If the user thereafter at an action decision node 822 decides to cancel the entry order and close the position, the entry order is so removed, and a cancel and close position order is added (step 824). If the user instead decides to do nothing, the entry order is just removed (step 826). Alternatively, if the user decides to just cancel the entry order, the entry order is removed and a cancel order is added (step 828).

With reference again to the order status decision node 806, if it is determined that the order status is filled or partial fill (UROut), control is passed to a position decision node 830, as illustrated in FIG. 8A, where it is determined if there is a position from this entry for that particular symbol. If there is no position from this entry for that particular symbol, then the entry order is removed (step 832). If, however, there is a position from this entry for that particular symbol the user is warned (step 834) that a strategy that they were tracking is no longer running or is cancelled but a position has been taken. If the user thereafter at an action decision node 836 decides to close the position, the entry order is removed and an order to close the position is added (step 838). If, however, the user decides not to close the position, the entry order is removed (step 832), as discussed hereinabove.

With final reference to the order status decision node, if it is determined that the order's status in the trade server is a status not mentioned above, the entry order is removed (step 840), as illustrated in FIG. 8B.

Figure 9:
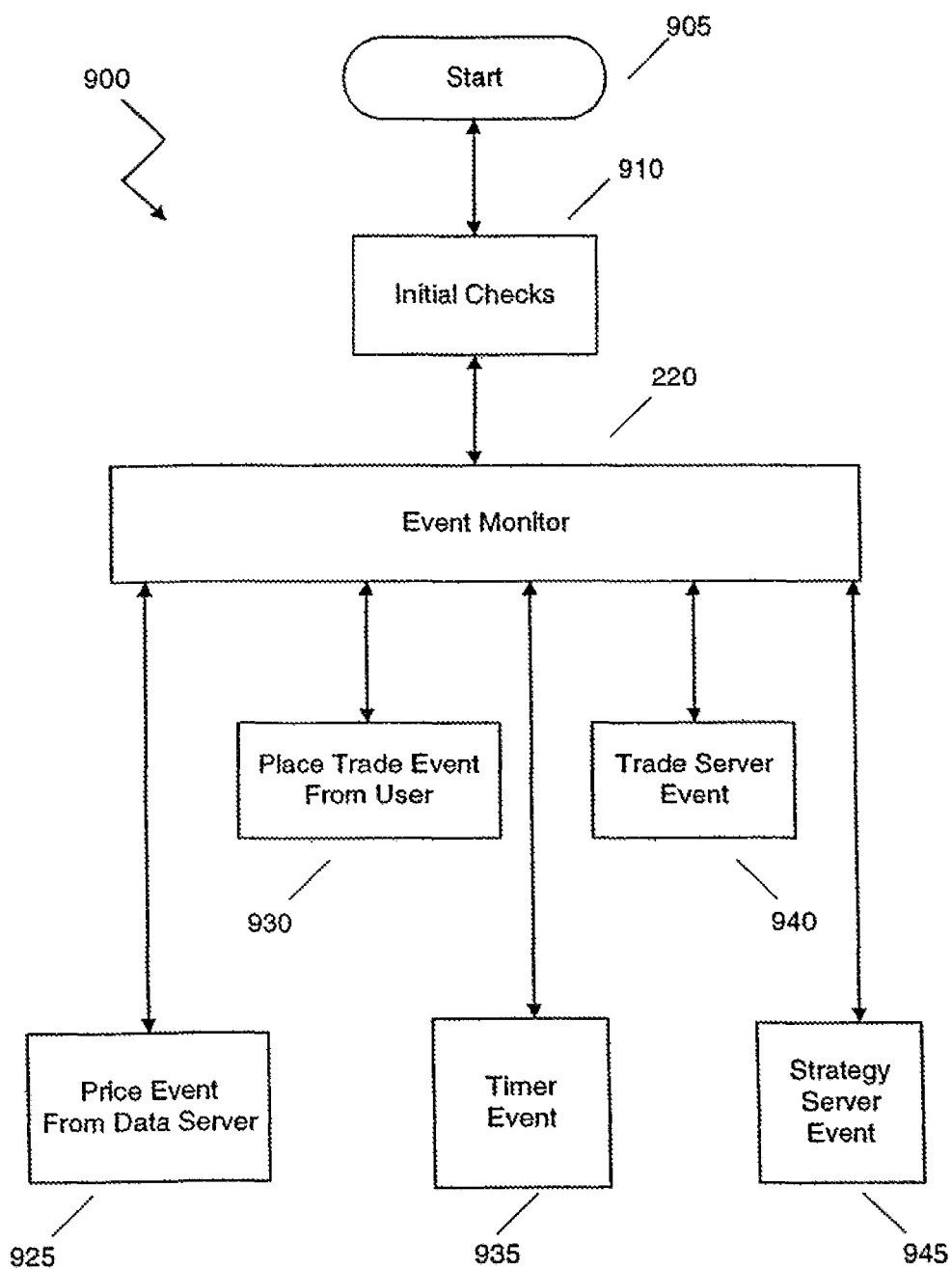
FIG. 9 is a high-level flowchart depicting the automation process for strategy exit orders of the present invention.

With reference now to FIG. 9 of the Drawings, there is illustrated a high-level flowchart depicting the automation process for strategy exit orders, generally designated by reference numeral 900, according to an embodiment of the present invention. The automation process for the exit orders is similar to the process for the entry orders as described in FIG. 2. As with the entry order automation process as described in FIG. 2, the exit order automation process 900 begins when a strategy exit order is triggered (step 905). Next, initial checks are performed on the order (step 910). Initial Checks 910 determines whether or not the exit order has any time, position, or price restrictions. Next, the order is added to an Event Monitor 220, where the order waits to be filled by changing market conditions. With reference again to FIG. 9, there are illustrated various modules of the automation process, including a Price Event From Data Server 925, a Place Trade Event From User 930, a Timer Event 935, a Trade Server Event 940 and a Strategy Server Event 945. The aforementioned separate modules of the automation process for exit orders perform similar functions as the corresponding modules in the entry order automation process described in FIG. 2.

Figure 10A:
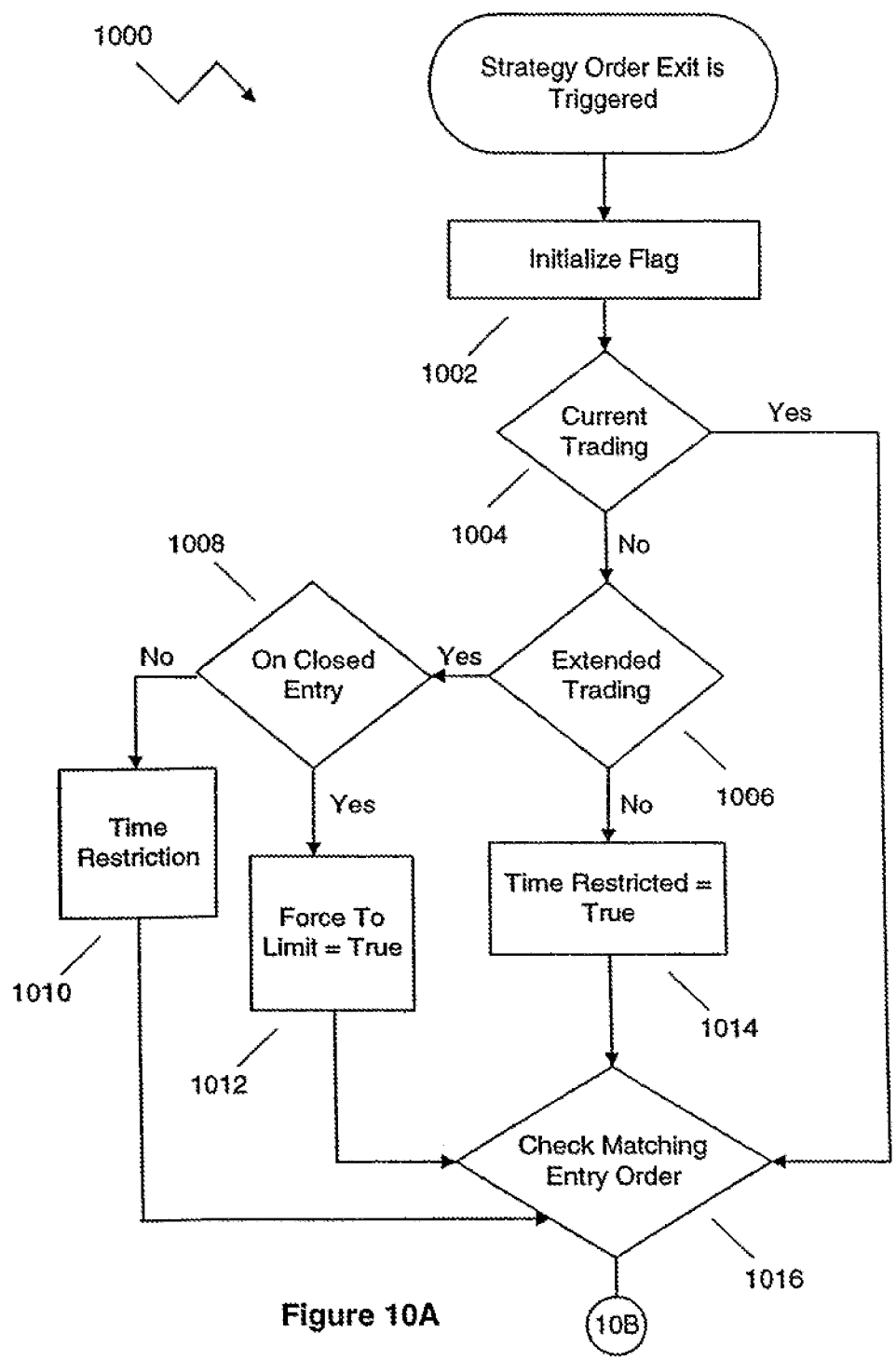
FIGS. 10A and 10B are flow charts that depicts the process and methodology of the Initial Checks module for exit orders.
Figure 10B:
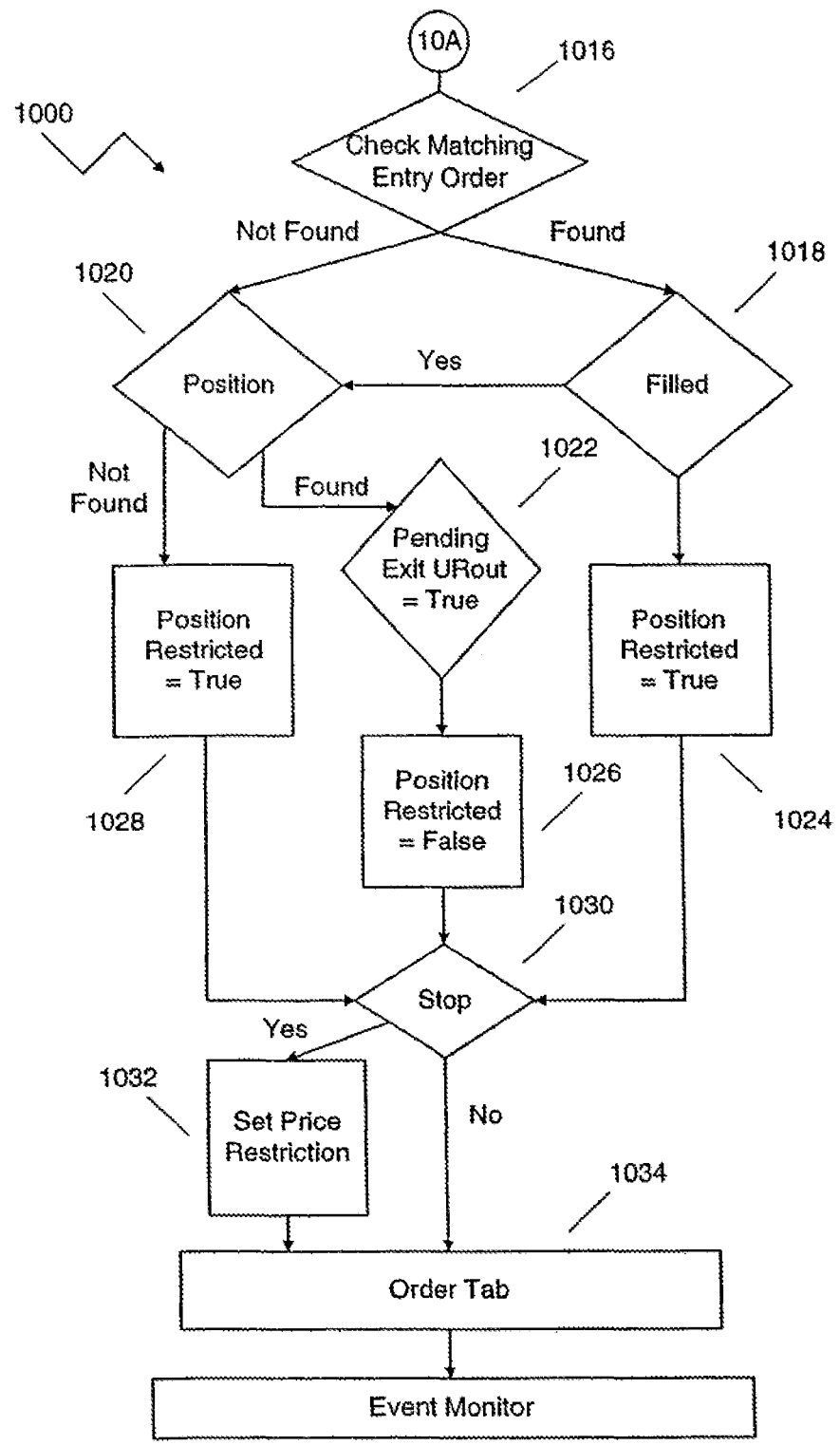

With reference now to FIGS. 10A and 10B, there is illustrated a flow chart that depicts the process and methodology of the Initial Checks module 910 in FIG. 9 in more detail. The algorithm for the Initial Checks module 910, generally designated in FIGS. 10A and 10B by the reference numeral 1000 begins when an exit strategy order is triggered. The order then passes to an Initialize Flags routine (step 1002) where various flags, that help monitor the exit order throughout the automation process, are set to their default value. As with the entry order automation process flags, the exit order automation process flags are used to indicate whether or not a particular order is restricted from being sent to the market. The automation process utilizes the same flags for exit orders as are used for entry orders, as described in FIG. 3. Further, the flags utilized for exit orders are set to the same default settings as the corresponding entry orders flags described above in FIG. 3.

Next, Initial Checks Module 910 determines if there are any Time Restrictions on the order that was generated by the trading strategy, e.g., by perusal of the status of the Time Restricted Flags. The order is then passed from Initialize Flags 1002 to a current trading decision node 1004, where it is determined whether or not the order was triggered in the current regular trading session. If the order was triggered in the current regular trading session, control is passed to a Check for Matching Entry Order 1016 described in more detail hereinbelow. If, however, the order was not triggered in the current regular trading session, control then passes to an extended trading decision node 1006 where it is determined if the order was triggered in a current extended trading session. If the order was not triggered in the current extended trading session, the Time Restricted Flag is set to TRUE (step 1014) and the order is passed to the Check for Matching Entry Order 1016. If, however, the order was triggered during the extended trading session, the order is passed to an On Close Entry decision node 1008 where it is determined if the order is an On Close Entry Order. If the order is an On Close Entry Order, then the Boolean Flag for Force to Limit is set equal to TRUE (step 1012) and the order is then passed to the aforementioned Check for Matching Entry Order 1016. If, however, the order is not an On Close Entry Order, the Time Restricted Flag is set to TRUE (step 1010) and the order is passed to Check for Matching Entry Order 1016.

With reference now to FIG. 10B, the Initial Checks Module 910 next determines if there are any position restrictions on the exit order that were generated by the trading strategy. In particular, the Check for Matching Entry Order 1016 checks for matching entry orders. If matching entries are found the order is passed to a filled decision node 1018 where it is determined if the matching entry order is filled or partially filled. If the order is not filled or partially filled, the aforementioned Position Restricted Flag is set equal to TRUE (step 1024) and the order is passed to a Stop Order 1030.

With reference again to Check for Matching Entry Order 1016, if the order is filled or partially filled the order is passed to a position decision node 1020 where if the order is a sell order, long positions are referenced and if the order is to cover, short positions are referenced. If, at decision node 1020, the described positions are found, the order is passed to 1022 where all open exit orders for the matching entry are found and subtracted from the entry quantity. If at node 1022 the exit order's quantity is greater than the net quantity, the Pending Exit UROut Flag is set equal to TRUE and the Position Restricted Flag is set equal to FALSE (step 1026) before the order is passed to a Stop Order 1030. Returning now to position decision node 1020, if the aforementioned positions are not found, the Position Restricted Flag is set equal to TRUE (step 1028) and the order is passed to Stop Order 1030.

Next, the Initial Checks module 910 determines if there are any price restrictions on the exit order that were generated by the trading strategy. Stop Order 1030 determines whether the order is a stop order. If the order is a stop order the cover price restriction is set to execute the trade if the trade price is less than the stop price, or the sell price restriction is set to execute the trade if the trade price is greater than the stop price (step 1032). The order is then passed to an Order Tab node 1034 where the order is checked for multiple entries. If Stop Order 1030 determines that the order is not a stop order then the order is passed to the Order Tab node 1034 where the order is added to the account manager and checked for multiple entries. The Order Tab node 1034 then passes the order to the aforementioned Event Monitor 220 discussed in connection with FIG. 2.

Figure 11:
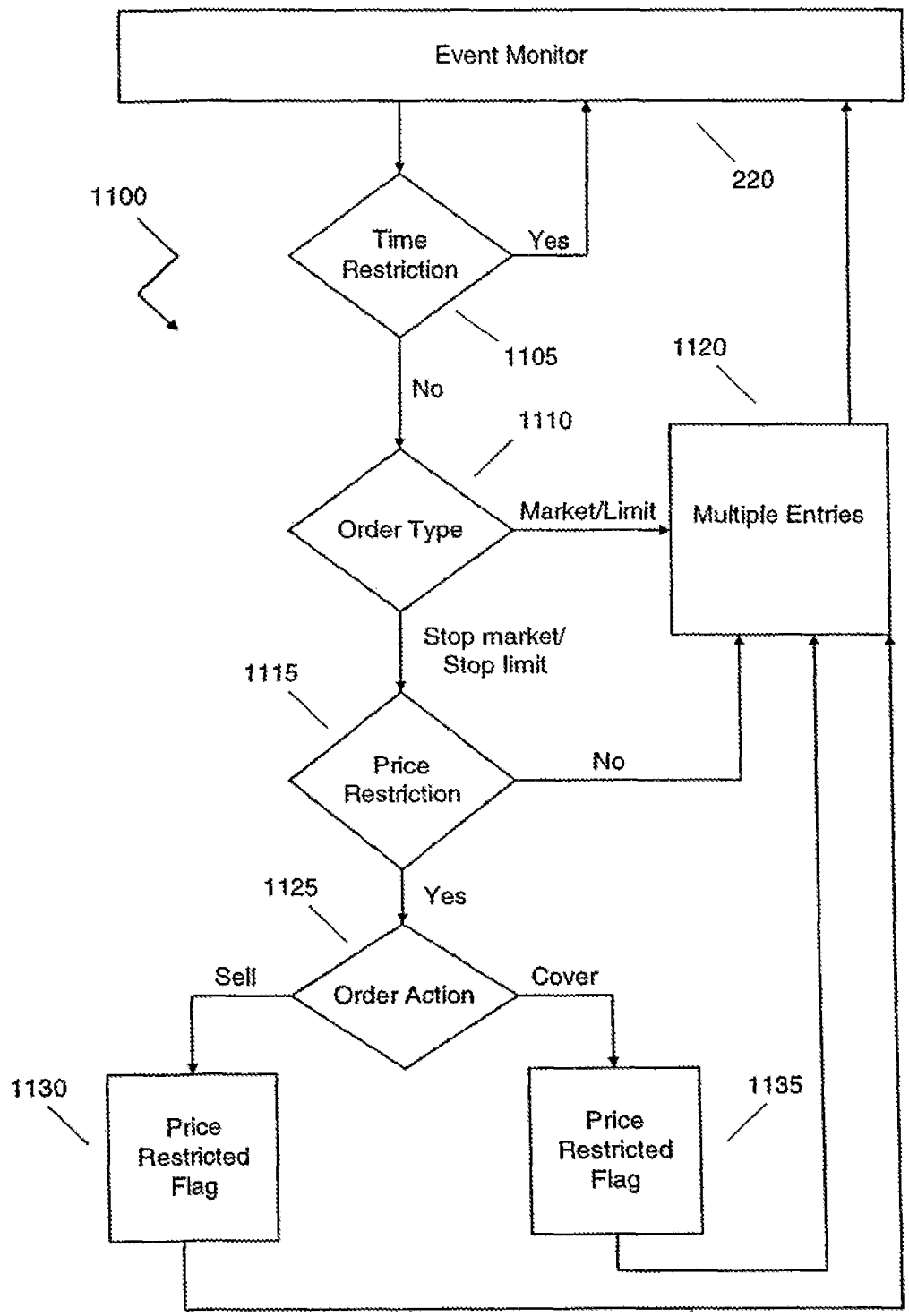
FIG. 11 is a flow chart that depicts the process and methodology of the Price Event from Data Server module for exit orders.

With reference now to FIG. 11, there is illustrated a flow chart depicting the process and methodology of the Price Event from Data Server module 925 illustrated in FIG. 9. The methodology of the Price Event from Data Server module 925 generally designated in FIG. 11 by reference numeral 1100, starts when an exit order is received from the Event Monitor 220. The Price Event from Data Server module 225, first determines if the order is time restricted (decision node 1105). If the order is time restricted, the order is returned to the Event Monitor 220, as illustrated. If, however, the order is not time restricted, the order is passed to an order type decision node 1110 where the order type is determined. For example, if the order is a market or limit order, then the order is passed to a Check for Multiple Entries (node 1120). If, however, the order is a stop market or stop limit order, the order is passed to a price restriction decision node 1115 where it is determined if the order is price restricted. If the order is not price restricted, then the order is passed to the aforementioned Check for Multiple Entries (node 1120). If the order is price restricted, the order is passed on to order action node 1125 where the order action is determined. If the order action is to sell, then the order is passed to a sell node 1130, where if the trade price is less than or equal to the stop price, the Price Restricted Flag is set equal to FALSE. If, however, the order action is to cover, the order is passed to a cover node 1135, where if the trade price is greater than or equal to the stop price, the Price Restricted Flag is set equal to FALSE. The orders from both nodes 1130 and 1135 are then passed to the aforementioned Check for Multiple node 1120. All orders sent to the Check for Multiple Entries mode 1120 are then returned to the Event Monitor 220.

Figure 12:
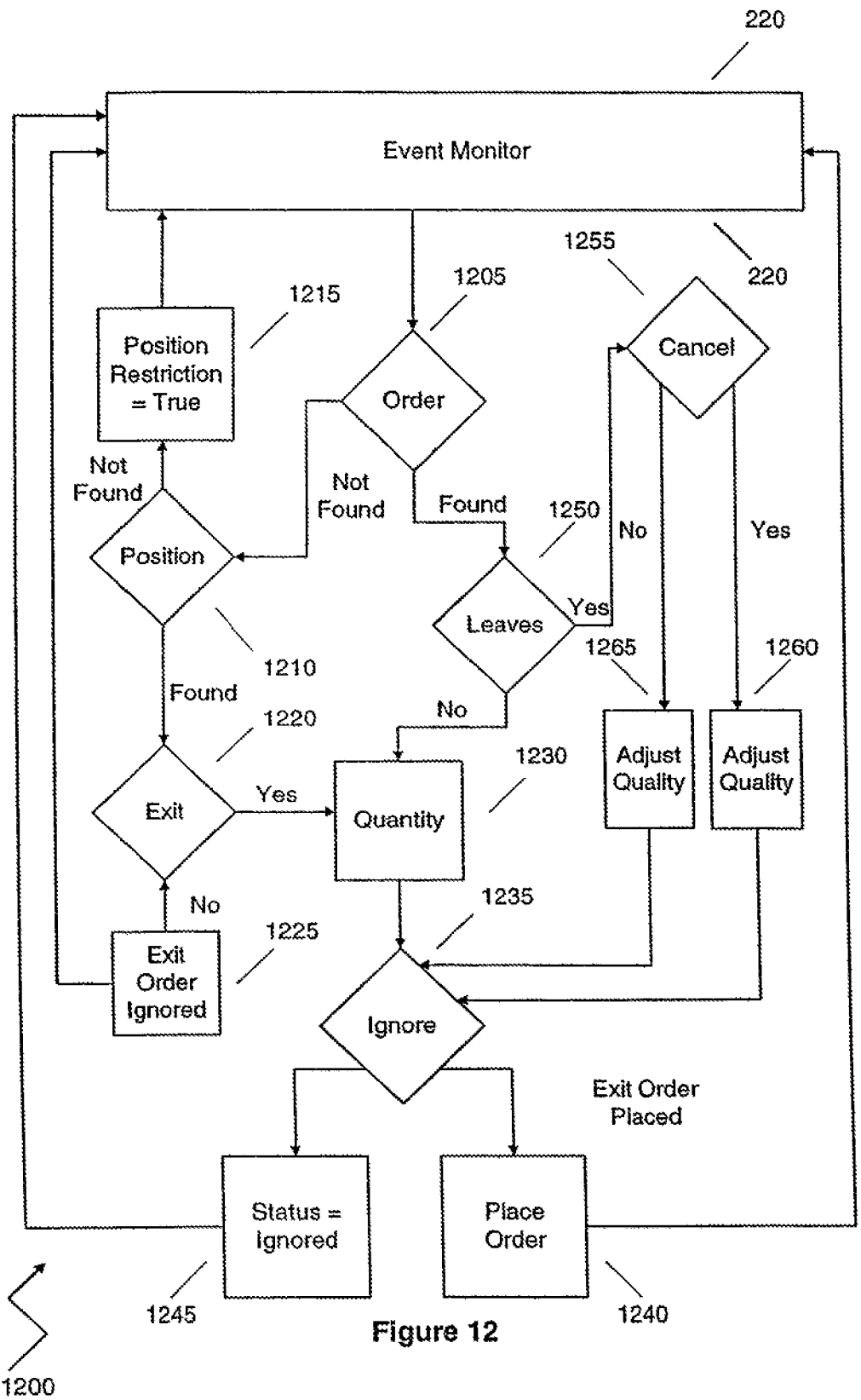
FIG. 12 is a flow chart that depicts the process and methodology of the Place Trade Event module for exit orders.

With reference now to FIG. 12 of the Drawings, there is illustrated a flow chart depicting the process and methodology of the Place Trade Event module 930 illustrated in FIG. 9. The methodology of the Place Trade Event module, generally designated by the reference numeral 1200, starts when a non-restricted unsent order is received from the Event Monitor 220. At an order decision node 1205, the corresponding entry order is referenced. If the corresponding entry order is not found, the exit order is passed to position decision node 1210 where long positions are checked for sell orders and short positions are checked for cover orders. If the described positions are not found, the exit order's Position Restricted Flag is set equal to TRUE (step 1215) and the order is returned to the Event Monitor 220. If, however, at position decision node 1210, the described positions are found, the user is warned that no matching entry orders exist but that a position does exist (step 1220). If, at exit decision node, the user decides not to exit the position, the exit order is set to ignored (step 1225) and is returned to the Event Monitor 220. If, at exit decision node 1220, the user decides to exit the position, the order is passed to quantity node 1230, where the exit order quantity is reduced, if necessary. Next, the user is prompted to either place the exit order or ignore the exit order (step 1235). If the user places the exit order, the order is sent to the trade server (step 1240) before control is returned to the Event Monitor 220. If, however, the user ignores the exit order, the exit order's Trade Server Status is set to ignored (step 1245) before the order is returned to the Event Monitor 220.

Returning now to order decision node 1205, if the entry order is found, the order is passed to leaves decision node 1250, where it is determined if the found entries have leaves. Leaves refer to the quantity that remains after a partial fill. For example, if an order to buy 1000 shares of XYZ stock is partially filled with 600 shares, then there are 400 remaining shares to be filled. The 400 shares are referred to as leaves. If, at leaves decision node 1250, the found entries do not have leaves, the order is passed to quantity node 1230 where the order's quantity is reduced, if necessary, and the order continues through the remainder of the Place Trade Event automation process 930 as described above. If, however, at order decision node 1250, it is determined that the found entries do have leaves, the order is passed to cancel decision node 1255 where the user is informed that the entry order that is being exited has only partially been filled. If, at cancel decision node 1255, the user decides to cancel the outstanding entry order, the exit order's quantity is adjusted to reflect the entry order's filled quantity (step 1260) and the order is the passed to decision node 1235 where the order continues through the remainder of the Place Trade Event automation process 930 as described above. If at cancel decision node 1255, the user decides not to cancel the outstanding entry order, the exit order's quantity is adjusted to reflect the entry order's filled quantity (step 1265) and a new exit order is added for the leaves with the Position Restricted Flag set equal to TRUE. The order is then passed to decision node 1235 where the order continues through the remainder of the Place Trade Event automation process 930 as described above.

Figure 13:
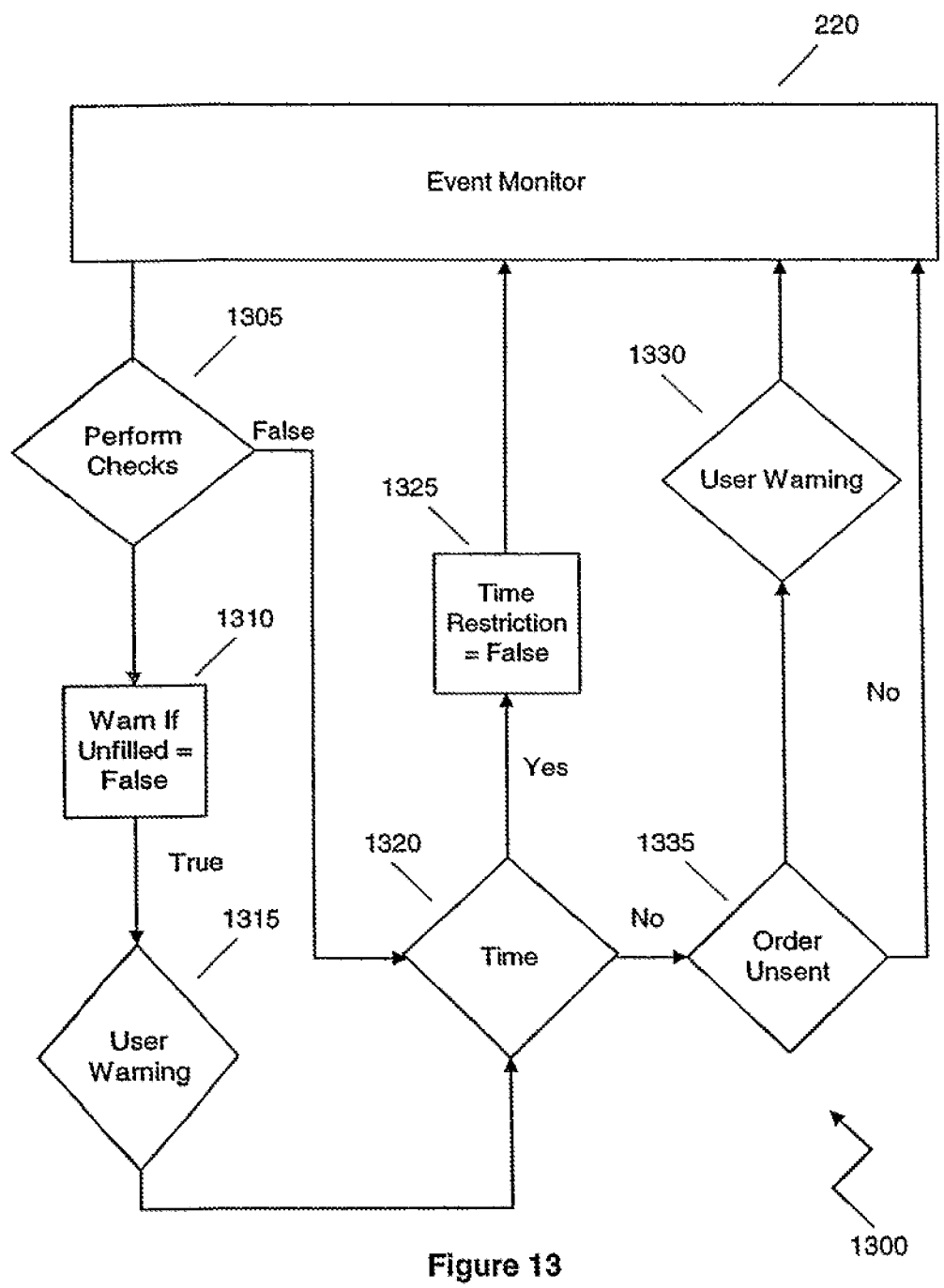
FIG. 13 is a flow chart that depicts the process and methodology of the Timer Event module for exit orders.

With reference now to FIG. 13, there is illustrated a flow chart that depicts the process and methodology of the Timer Event module 935 illustrated in FIG. 9. The methodology of the Timer Event module 935, generally designated in FIG. 13 by the reference numeral 1300, constantly monitors exit orders that have been placed into the market and alerts the users if their order is not yet executed by a Pool of Liquidity 120. The Timer Event module methodology 1300, begins by checking (step 1305) if 1) the Strategy Status Flag is filled, and 2) the Trade Server Status is unfilled, and 3) a prescribed period of time has elapsed and 4) the Warn if Unfilled Flag is TRUE, and 5) it is during market hours, and 6) the order is not ignored. If the above criteria are all TRUE, then the exit order's Warn if Unfilled flag is set to FALSE (step 1310) and the user is then warned that a predetermined amount of time has passed since notification to place the order and that the strategy filled the entry order, but the order has not been filled by the market at (step 1315). Control is then passed to a time decision node 1320 where it is determined whether or not the current time is in a regular trading session. If the current time is in a regular trading session, the order's Time Restriction Flag is set to FALSE (step 1325) and the order is returned to the Event Monitor 220. If the current time is not in a regular trading session (step 1320), it is determined whether the order is unsent and filled by the strategy (step 1335). If the order is unsent and filled by the strategy, the user is warned (step 1330) that the strategy has filled the order, but the market is now closed and the order is unsent and the order will be set to ignored. Further, the user will be given the option to place the order in the extended trading session as discussed hereinabove. The order is then returned to the Event Monitor 220. Returning now to step 1335, if the order is not unsent and filled by the strategy, it is returned to the Event Monitor 220. Returning to the perform checks decision node 1305, if any of the aforementioned criteria are FALSE, control transfers to the time decision node 1320, and continuing thereafter as described hereinabove.

Figure 14A:
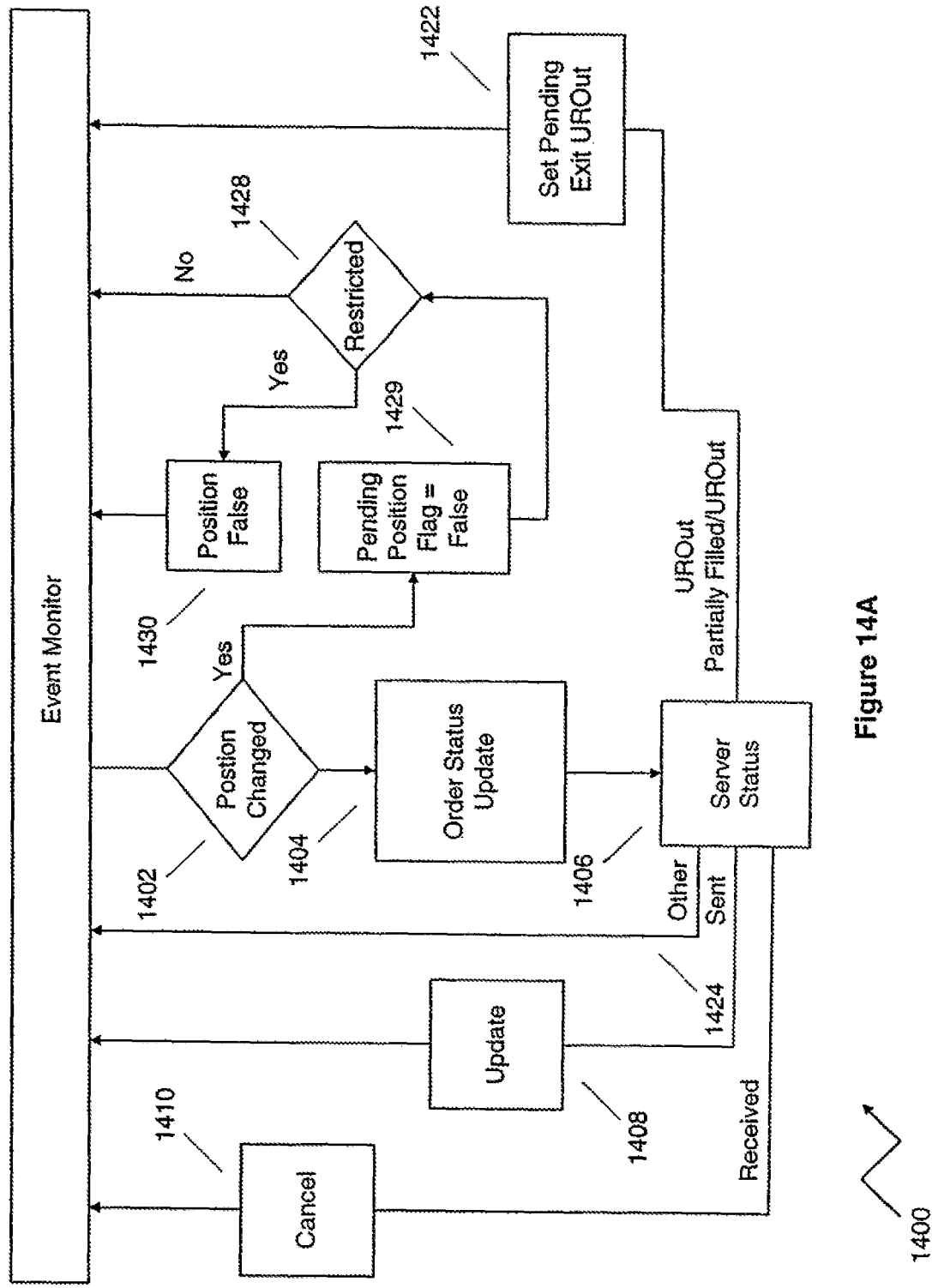
FIG. 14 is a flow chart that depicts the process and methodology of the Trade Server Event module for exit orders.
Figure 14B:
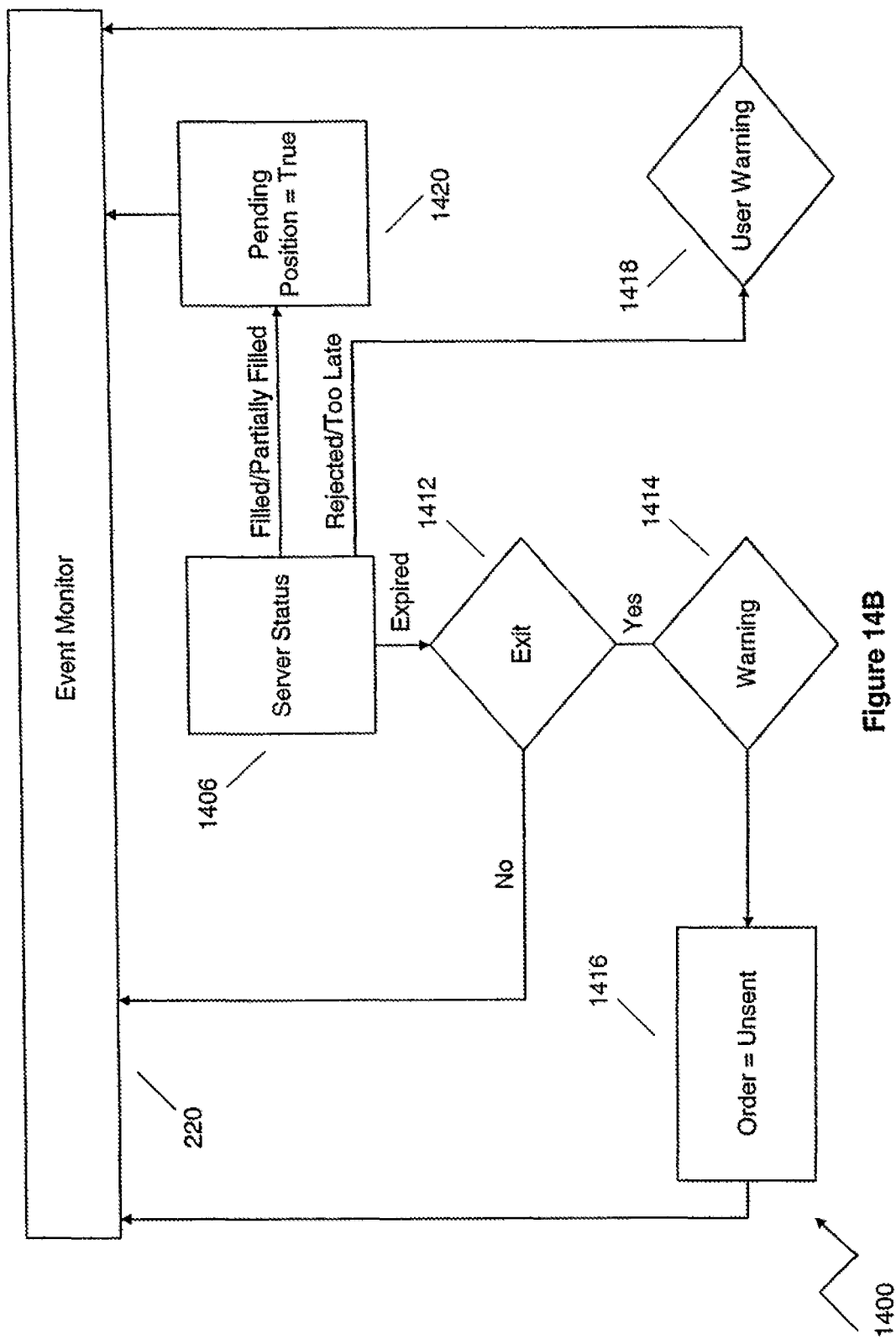

With reference now to FIGS. 14A and 14B, there is illustrated a flow chart that depicts the process and methodology of the Trade Server Event module 940 in FIG. 9. The methodology of the Trade Server Event module 940, generally designated by reference numeral 1400, monitors market exit orders once they are placed into the market stream. The Trade Server Event module methodology 940 begins by determining whether the event is a position changed event for the order (step 1402). If it is a position changed event, the pending position flag is set to FALSE (step 1429). Next, at restricted node 1428, it is determined if there are any entry orders for the symbol that are position restricted with a quantity of 0. If there are such orders, the Position Restricted Flag is set to FALSE (step 1430) and the order is returned to the Event Monitor 220 as illustrated. If, however, at restricted node 1428, it is determined there are not any entry orders for the symbol that are position restricted with a quantity of 0, the order is then returned to Event Monitor 220, as illustrated.

Returning now to position changed node 1402, if it is determined that the Trade Server Event received from the Event Monitor 220 is not a position changed event, the trade order status is updated (step 1404). The order's Trade Server Status is then checked at server status decision node (step 1406). If the order's Trade Server Status is "sent," the automation process then updates the trade server sequence number before returning control back to the Event Monitor 220 (step 1408). If it is determined at server status decision node 1406 that the order's Trade Server Status is "received," the automation process will then send any cancel orders that were queued up during the sending state (step 1410) before returning control to the Event Monitor 220.

With reference to FIG. 14B, server status decision node, designated by reference numeral 1406, represents the same server status decision node 1406 in FIG. 14A. Returning now to server status decision node (step 1406), if it is determined that the order's Trade Server Status is "expired," it is then determined whether the exit order was filled by the strategy (step 1412). If it is determined that the order was not filled by the strategy, the order is returned to the Event Monitor 220. If it is determined that the exit order was filled by the strategy (step 1412), the user is warned (step 1414) that the strategy has filled the order but the market is closed and the order is expired. The user is then given the option of placing the order in the extended trading session (step 1414). Finally, the order is time restricted and the order's state is changed to unsent before returning the order to the Event Monitor 220 (step 1416).

With reference again to FIG. 14A and returning to server status decision node 1406, if it is determined that the order's Trade Server Status is "rejected" or "too late," the user is warned that the strategy order has been rejected or is too late (step 1418) before the order is returned to the Event Monitor 220. Returning again to server status decision mode 1406, if it is determined that the order's Trade Server Status is "filled" or "partially filled," the Pending Position Update Flag is set to TRUE (step 1420) before the order is returned to the Event Monitor 220. Returning again to server status decision node 1406, if it is determined that the status of the entry order is "UROut" or "partial fill (UROut)" and the exit's quantity is greater than the net quantity, the order's Set Pending ExitUROut Flag is set to TRUE before returning the order to the Event Monitor 220 (step 1422). If, however, it is determined that the status of the entry order is "UROut" or "partial fill (UROut)" and the exit's quantity is less than the net quantity, the order's Set Pending ExitUROut Flag is set to FALSE before returning the order to the Event Monitor 220 (step 1422). Returning again to server status decision node 1406, if it is determined that the status of the exit order is not one of the statuses mentioned above, then the status is recognized as "other" and the order is returned to the Event Monitor 220 as illustrated in FIG. 14A (step 1424).

Figure 15A:
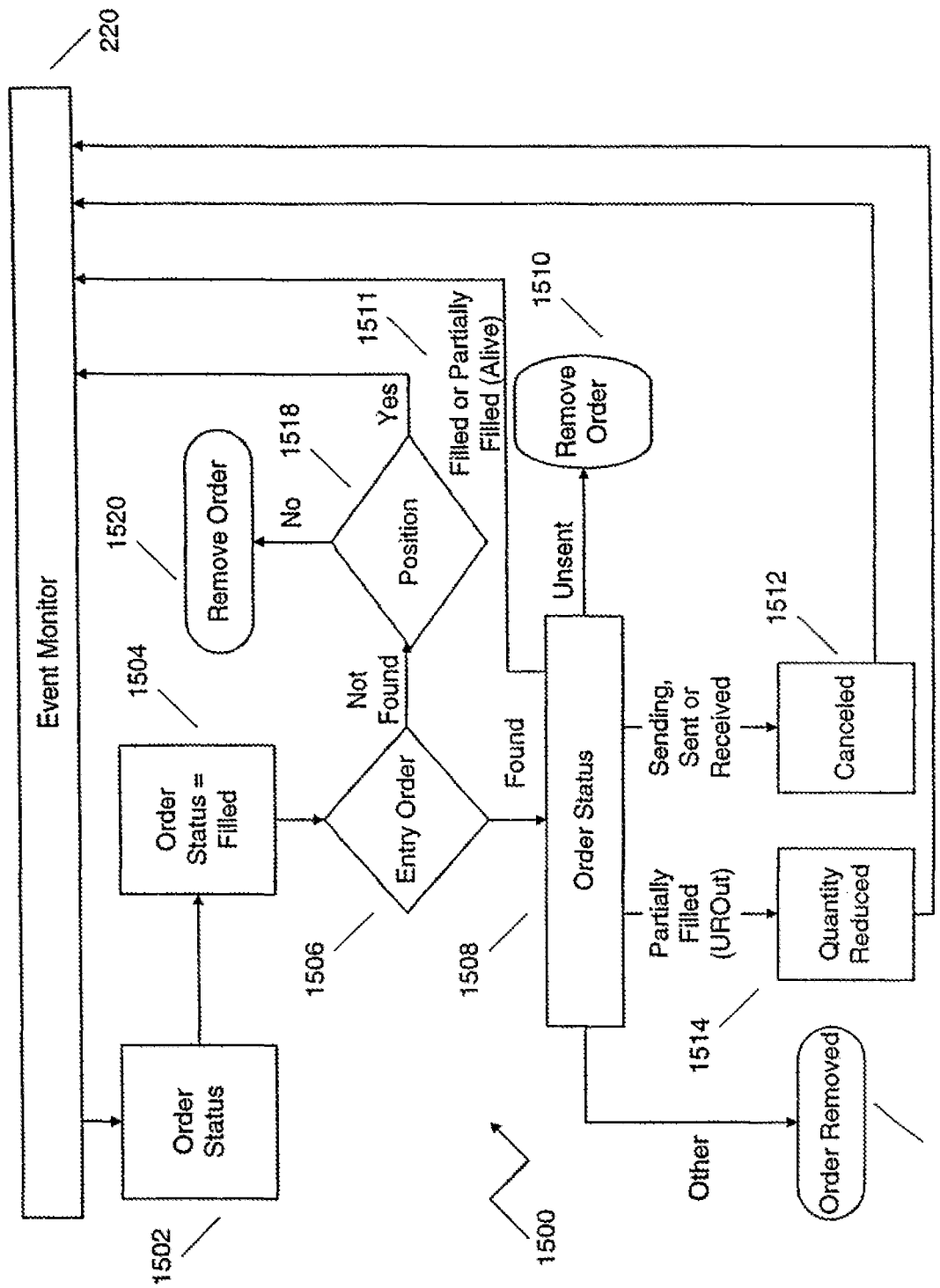
FIG. 15 is a flow chart that depicts the process and methodology of the Strategy Server Event module for exit orders.
Figure 15B:
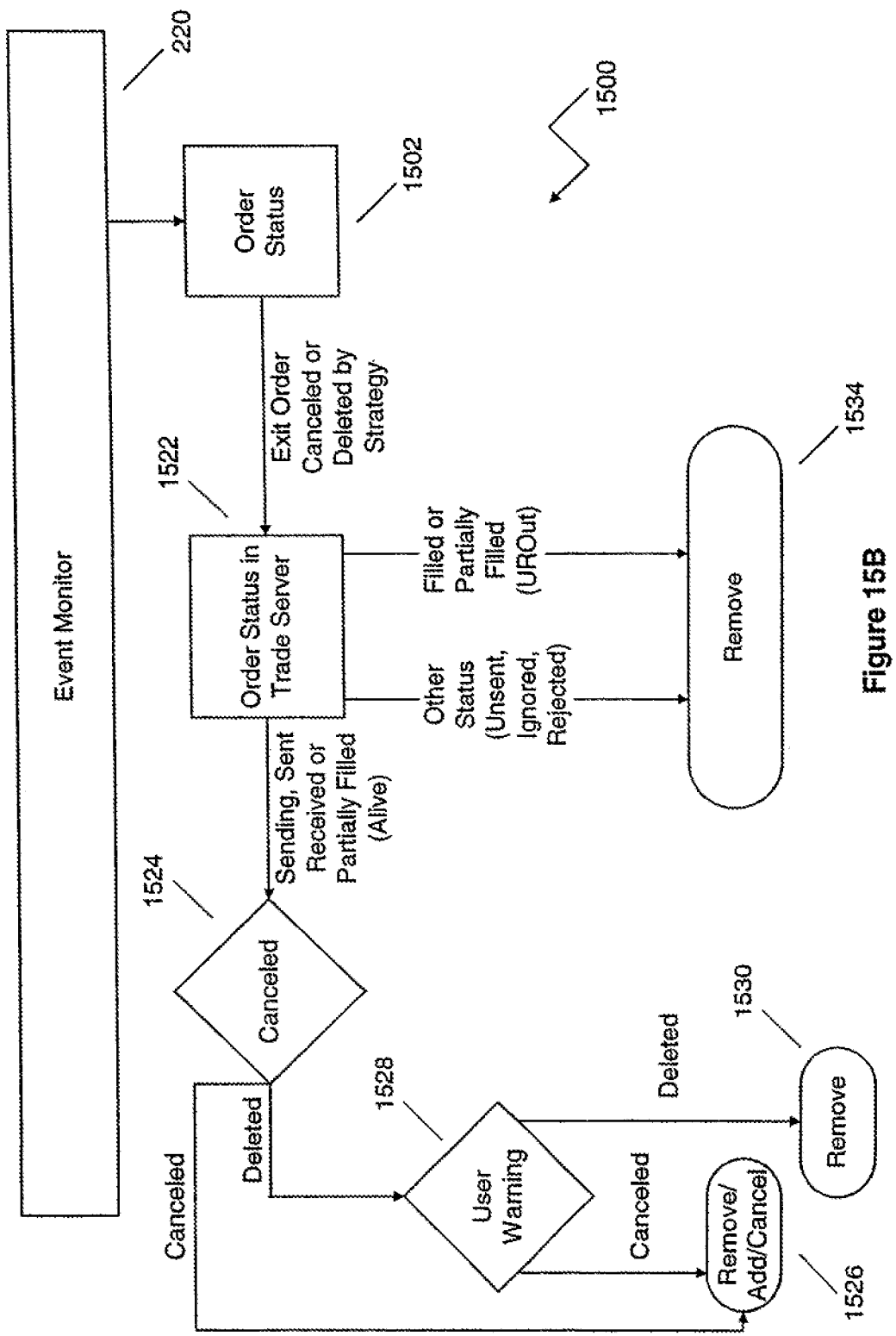

With reference now to FIGS. 15A and 15B of the Drawings, there is illustrated a flow chart that depicts the process and methodology of the Strategy Server Event module for exit orders 945 illustrated in FIG. 9. The methodology of the Strategy Server Event 945 is a module, generally designated by the reference numeral 1500, of the automation process that monitors the trading strategies on the users' computer, and determines whether or not a particular trading strategy is still in use, and determines whether the market exit orders that were triggered by the trading strategy should be canceled or removed.

The methodology of the Strategy Server Event module begins with a check of the exit order's Strategy Server Status (step 1502) as illustrated in FIG. 15A. If the exit order has been filled by the strategy, the exit order's Strategy Status is set to filled, and the Strategy Filled Time is set to the current time (step 1504). The entry order is then referenced (step 1506). If the entry order is not found, the order passes to position decision node 1518 where it is determined whether or not there is a position. If there is a position, the order is returned to the Event Monitor 220, as illustrated. If, however, there is not a position, the exit order is removed (step 1520).

Returning now to step 1506, if the entry order is found, the entry order status is determined at order status decision node 1508. If it is determined that the entry order status is "filled" or "partially filled (alive)," the order is returned to the Event Monitor 220 (step 1511). If, at order status decision node 1508, it is determined that the entry order status is "unsent," the exit order is removed and the entry order's quantity is reduced or the entry order is removed (step 1510). If, at order status decision node 1508, it is determined that the status of the entry order is "sending," "sent" or "received" a cancel order for the entry order is added and the Pending UROut Flag is set to TRUE before the order is returned to the Event Monitor 220 (step 1512). If, at order status decision node 1508, the status of the order is "Partially Filled (UROut)," the exit order's quantity is reduced (step 1514) before the order is returned to the Event Monitor 220. If, at order status decision node 1508, the status of the order is a status not mentioned above, the exit order is removed (step 1516).

Returning now to status check (step 1502), and with reference now to FIG. 15B, if it is determined that the order has been cancelled or deleted by the strategy, then the exit order status is checked in the trade server (step 1522). If, at step 1522, it is determined that the status of the order is "sending," "sent," or "received," the canceled decision node 1524 determines whether the order was deleted or canceled. If the order was canceled, the automation process removes the exit order, adds a cancel order, or queues a cancel order (step 1526). If, however, at canceled decision node 1524, it is determined that the order was deleted, the user is warned (step 1528) that a strategy being tracked is no longer running and that there is an open order. If the user cancels the order, the automation process removes the entry order, at warning decision mode 1528, adds a cancel order, or queues a cancel order (step 1526). If the user does not cancel the order, the automation process removes the exit order (step 1530).

Returning now to step 1522, if it is determined that the entry order status is "filled" or "partially filed (UROut)," the exit order is removed (step 1534). Again, at step 1522, if it is determined that the status of the exit order is of another status, the exit order is removed at 1534 (step 1534).

Figure 16:
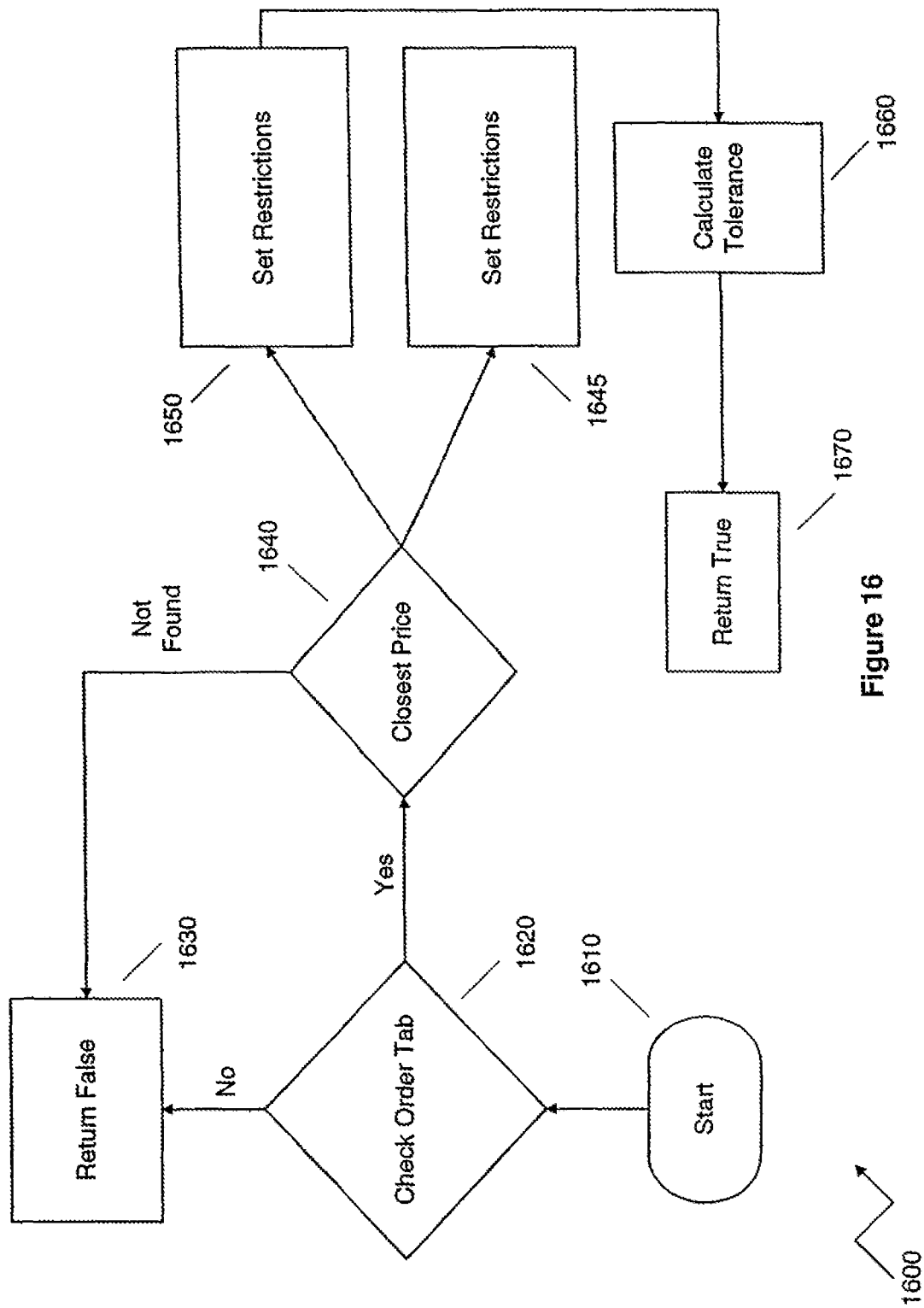
FIG. 16 is a flow chart that depicts the process and methodology of the Check for Multiple Entries module.

With reference now to FIG. 16 of the drawings, there is illustrated a flow chart that depicts the process and methodology of the Check for Multiple Entries module of the automation process generally designated by the reference numeral 1600. The Check for Multiple Entries module 1600 ensures that the automation process does not simultaneously place conflicting orders. For example, if a trader has a long position for a particular symbol, the Check for Multiple Entries function will not allow a simultaneous entry order for a short position for the same symbol. The Check for Multiple Entries module 1600 determines which entry order is the closest to the current trading price and restricts the other orders. The Check for Multiple Entries module further calculates a tolerance range that prevents minor fluctuations in the trading price from causing the automation process to repeatedly cancel and replace these orders.

The Check for Multiple Entries module begins when the module is called by the automation process modules (step 1610). First, the Check for Multiple Entries module checks for active strategies with entries on both the long and short side that have a Trade Server Status of "unsent," "sent," "sending," "received," "partial fill (alive)" or "UROut" (step 1620). If a strategy is not found, the module returns a FALSE (step 1630).

If, however, a strategy is found with one of the above mentioned strategies, the Check for Multiple Entries module 1600, next finds the entry order that has the closest order price to the current trade price and that is not restricted or ignored (step 1640). If an order is not found, control passes to step 1630 where the Check for Multiple Entries module 1600 returns a false. If, however, the closest entry order is for a long entry, the Set Restrictions node 1650 sets the Multiple Entry Restricted Flag to FALSE for all other long entries for the strategy and sets the Multiple Entry Restricted Flag to TRUE for all short entries for the strategy. Further, if an order was cancelled, the Multi Pending UROut Flag is set to TRUE for all long entries in the strategy mode the Multi Pending UROut restriction is removed when the UROut notice is received in the Trade Server Event for the cancelled order. Next, a new tolerance range is calculated (step 1660) before returning a TRUE (step 1670).

The tolerance range is used to prevent minor fluctuations in price from canceling and replacing orders. By way of example, there may be an order to buy at $15 and an order to short at $25 and the market price is currently fluctuating around $20. Thus, every time the market goes above and below $20, the automation process has to cancel either the buy or short order and replace it with the other. A tolerance level solves this problem by creating a zone where the automation process does not alter the active order. For example, if the tolerance zone is between $19 and $21 for the above example and the market is trading at $20½, the market would have to drop below $19 before the automation process would replace the short order with an active buy order for the symbol. Likewise, to cancel the buy order and replace it with a short order, the market would have to rise above $21.

Returning now to Closest Price 1640, if the closest entry order is for a short entry, the Set Restrictions node 1645 sets the Multiple Entry Restricted Flag to FALSE for all other short entries for the strategy and sets the Multiple Entry Restricted Flag to TRUE for all long entries for the strategy. Further, if an order was cancelled, the Multi Pending UROut Flag is set to TRUE for all short entries in the strategy and the Multi Pending UROut restriction is removed when a UROut notice is received in the Trade Server Event for the cancelled order (step 1645). Next, a new tolerance range for the orders is calculated (step 1660). Finally, the Check for Multiple Exits function then returns a TRUE (step 1670).

Figure 17:
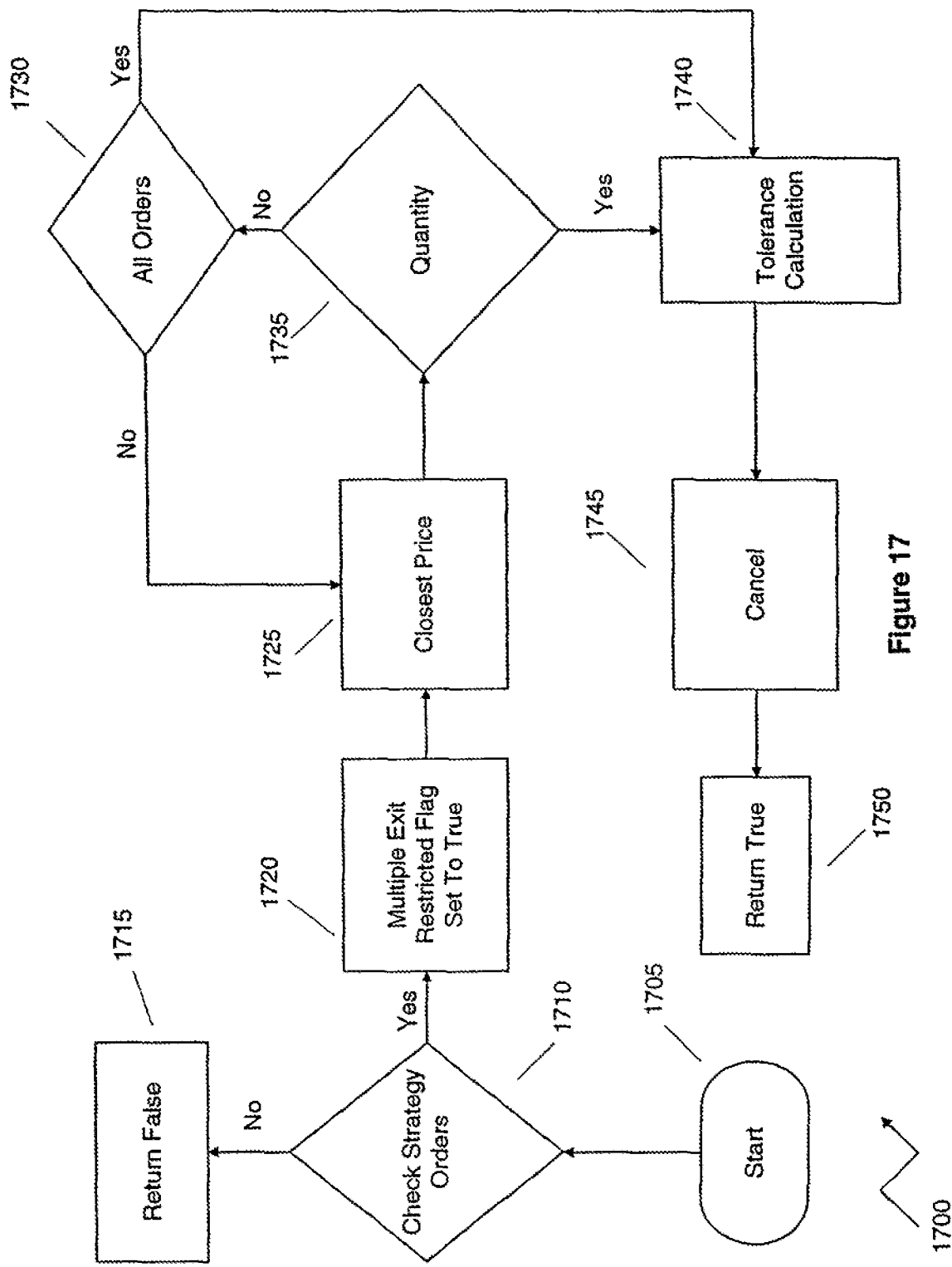
FIG. 17 is a flow chart that depicts the process and methodology of the Check for Multiple Exits module.

With reference now to FIG. 17 of the Drawings, there is illustrated a flow chart that depicts the process and methodology of the Check for Multiple Exits module of the automation process generally designated by the reference numeral 1700. Like the Check for Multiple Entries module 1600, the Check for Multiple Exits module ensures that the automation process does not simultaneously place conflicting orders.

The Check for Multiple Exits module begins when another module of the automation process calls the Check for Multiple Exits module 1700 (step 1705). The Check for Multiple Exits module 1700 checks for multiple exit orders for the strategy for a specific entry at Check Strategy Orders Tab 1710. The Check for Multiple Exits module 1700 only references active exit orders with a Trade Server Status of "unsent," "sent," "sending," "received," "partially filled," or "UROut" (step 1710). If an exit order is not found, the module returns a FALSE (step 1715).

If, however, an exit order is found at Check Strategy Orders Tab 1710, the module sets the Multiple Exit Restricted flag to TRUE for each exit order (step 1720). Control then passes to Closest Price 1725 where the module determines which exit order has the closest order price to the current trade price, has the Multiple Exit Restricted Flag set to TRUE and isn't otherwise restricted. The Closest Price 1725 then sets the Multiple Exit Restricted Flag to FALSE.

Control then passes to Quantity 1735 where it is determined if the quantity of the exit orders with Multiple Exit Restricted Flags set to FALSE is greater than or equal to the Position Quantity. If the quantity of the exit orders is greater than the position quantity, control passes to Tolerance Calculation 1740 where a new tolerance range is calculated. If, however, at 1735, the quantity of the exit orders is not greater than the position quantity, control passes to All Orders decision node 1730 where it is determined if all of the exit orders have been checked. If all of the exit orders have not been checked, control passes back to Closest Price 1725. If, however, at All Orders 1730, it is determined that all of the exit orders have been checked, control passes to Tolerance Calculation 1740 where a new tolerance range is calculated. The tolerance range for the Multiple Exits module 1700 functions much in the same way as in the Multiple Entries module 1600 described hereinabove.

Control then passes to Cancel 1745, where the Check For Multiple Exits module 1700 cancels any exit orders that are in the market and have a Multiple Exit Restricted flag set to TRUE. If an order is cancelled, the set Multi Pending UROut flag is set to TRUE for all exit orders without any multiple exit restrictions. The Multi Pending UROut restriction is then removed when the UROut is received in the Trade Server Event for the cancelled order (step 1745). Finally, a TRUE is returned at step 1750.

Although the system and methodology of the instant invention are at present best suited for a fixed or standalone computer, e.g., the computer 110 in FIG. 1, as wireless devices become more prevalent and bandwidth and capabilities increase, the principles of the present invention will become increasingly applicable to a wireless trading environment via wireless devices, e.g., the wireless device 115 depicted in FIG. 1.

The foregoing description of the present invention provides illustration and description, but is not intended to be exhaustive or to limit the invention to the precise one disclosed. Modifications and variations are possible consistent with the above teachings or may be acquired from practice of the invention. Thus, it is noted that the scope of the invention is defined by the claims and their equivalents.

What is claimed:

1. A computer-implemented method for evaluating a user-created trading strategy, said method comprising:
   receiving, by a computer device, a user-created trading strategy comprising one or more rules, each rule specifying one or more trade criteria and one or more corresponding actions;
   downloading, by the computer device and from a database, a historical data stream of market data representing market conditions over a historical time period;
   executing, by the computer device, the user-created trading strategy over sequences of historical data in the historical data stream, including, for each time period of a plurality of time periods, evaluating each rule of the one or more rules including:
      determining whether the one or more trade criteria of the rule are satisfied by sequences of historical data within the time period,
      whenever the one or more trade criteria of the rule are satisfied by the sequences of historical data within the time period, simulating performance of the one or more corresponding actions of the rule using the sequences of historical data within the time period, and
      updating a measure of performance of the user-created trading strategy as a result of the simulated performance of the one or more corresponding actions of the rule;
   after executing the user-created trading strategy over the sequences of historical data, determining, by the computer device, whether the measure of performance of the user-created trading strategy satisfies a threshold measure of success;
   providing, by the computer device, feedback to a user that indicates whether or not the measure of performance of the user-created trading strategy satisfied the threshold measure of success;
   applying, by the computer device, each of the evaluated rules of the executed user-created trading strategy where the measure of performance of the user-created trading strategy satisfies the threshold measure of success to a data stream of real-time market data;
   determining, by the computer device, that one or more trade criteria for each of the evaluated rules of the executed user-created trading strategy are satisfied; and
   in response to determining that the one or more trade criteria for each of the evaluated rules of the executed user-created trading strategy are satisfied, generating, by the computer device, an order instruction.

2. The method according to claim 1, wherein the one or more trade criteria specify conditions under which to automatically generate an order instruction.

3. The method according to claim 1, wherein said downloading and said executing are performed automatically.

4. The method according to claim 1, wherein said generating said order instruction is performed automatically.

5. The method according to claim 1, further comprising: modifying, by the computer device, said order instruction.

6. The method according to claim 1, wherein receiving the user-created trading strategy comprises receiving, at the computer device, user input defining a new trading strategy.

7. The method according to claim 1, wherein receiving the user-created trading strategy comprises receiving, at the computer device, a user selection of a particular user-created trading strategy wherein the particular user-created trading strategy was previously created by the user.

8. The method according to claim 1, wherein the user-created trading strategy is written in English-like phrases.

9. A system for evaluating a user-created trading strategy, said system comprising:
   one or more computers configured to execute instructions that cause the one or more computers to perform operations comprising:
      receiving a user-created trading strategy comprising one or more rules, each rule specifying one or more trade criteria and one or more corresponding actions;
      downloading, from a database, a historical data stream of market data representing market conditions over a historical time period;
      executing the user-created trading strategy over sequences of historical data in the historical data stream, including, for each time period of a plurality of time periods, evaluating each rule of the one or more rules including:
         determining whether the one or more trade criteria of the rule are satisfied by sequences of historical data within the time period,
         whenever the one or more trade criteria of the rule are satisfied by the sequences of historical data within the time period, simulating performance of the one or more corresponding actions of the rule using the sequences of historical data within the time period, and updating a measure of performance of the user-created trading strategy as a result of the simulated performance of the one or more corresponding actions of the rule;

after executing the user-created trading strategy over the sequences of historical data, determining whether the measure of performance of the user-created trading strategy satisfies a threshold measure of success;

providing feedback to a user that indicates whether or not the measure of performance of the user-created trading strategy satisfied the threshold measure of success;

applying each of the evaluated rules of the executed user-created trading strategy where the measure of performance of the user-created trading strategy satisfies the threshold measure of success to a data stream of real-time market data;

determining that one or more trade criteria for each of the evaluated rules of the executed user-created trading strategy are satisfied; and in response to determining that the one or more trade criteria for each of the evaluated rules of the executed user-created trading strategy are satisfied, generating an order instruction.

10. The system of claim 9, wherein the one or more trade criteria specify conditions under which to automatically generate an order instruction.

11. The system of claim 9, wherein said downloading and said executing are performed automatically.

12. The system of claim 9, wherein said generating said order instruction is performed automatically.

13. The system according to claim 9, wherein the operations further comprise:

modifying said order instruction.

14. The system according to claim 9, wherein receiving the user-created trading strategy comprises receiving user input defining a new trading strategy.

15. The system according to claim 9, wherein receiving the user-created trading strategy comprises receiving a user selection of a particular user-created trading strategy wherein the particular user-created trading strategy was previously created by the user.

16. The system according to claim 9, wherein the user-created trading strategy is written in English-like phrases.

\* \* \* \* \*

UNITED STATES PATENT AND TRADEMARK OFFICE
CERTIFICATE OF CORRECTION

PATENT NO. : 10,755,350 B1  
APPLICATION NO. : 13/248654  
DATED : August 25, 2020  
INVENTOR(S) : William R. Cruz, Ralph L. Cruz and Peter A. Parandjuk Page 1 of 1

It is certified that error appears in the above-identified patent and that said Letters Patent is hereby corrected as shown below:

In the Specification

Column 1, Line 14, after "priority of" delete "Divisional of".

Column 1, Line 24, delete "October 4,2000," and insert -- Oct. 4, 2000, --, therefor.

In the Claims

Column 24, Line 42, in Claim 7, delete "strategy" and insert -- strategy, --, therefor.

Column 26, Line 19, in Claim 15, delete "strategy" and insert -- strategy, --, therefor.

Signed and Sealed this
Thirteenth Day of October, 2020

Andrei Iancu
*Director of the United States Patent and Trademark Office*